United States Patent
Prebble

(10) Patent No.: US 11,330,149 B1
(45) Date of Patent: May 10, 2022

(54) FINDING THE PAGE BACKGROUND COLOR RANGE

(71) Applicant: Konica Minolta Business Solutions U.S.A., Inc., San Mateo, CA (US)

(72) Inventor: Tim Prebble, Longmont, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 17/150,070

(22) Filed: Jan. 15, 2021

(51) Int. Cl.
| | | |
|---|---|---|
| *H04N 1/40* | (2006.01) | |
| *H04N 1/58* | (2006.01) | |
| *H04N 1/409* | (2006.01) | |
| *G06T 5/40* | (2006.01) | |
| *G06T 5/00* | (2006.01) | |

(52) U.S. Cl.
CPC ............. *H04N 1/58* (2013.01); *G06T 5/002* (2013.01); *G06T 5/40* (2013.01); *H04N 1/4092* (2013.01); *G06T 2207/10008* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 6,323,957 B1* | 11/2001 | Ball | H04N 1/58 358/1.9 |
| 11,069,043 B1* | 7/2021 | Prebble | H04N 1/407 |
| 11,100,355 B1* | 8/2021 | Prebble | G06K 9/00456 |
| 2005/0129310 A1* | 6/2005 | Herley | G06T 7/194 382/168 |
| 2008/0123945 A1* | 5/2008 | Andrew | G06T 7/11 382/164 |
| 2009/0323089 A1 | 12/2009 | Hayasaki | |
| 2010/0245935 A1* | 9/2010 | Sato | H04N 1/4092 358/448 |
| 2013/0004066 A1* | 1/2013 | Butler | H04N 1/6027 382/165 |
| 2021/0127038 A1* | 4/2021 | Kato | H04N 1/32261 |

* cited by examiner

*Primary Examiner* — Dung D Tran
(74) *Attorney, Agent, or Firm* — Osha Bergman Watanabe & Burton LLP

(57) ABSTRACT

A method to reduce background noise in a document image includes: extracting, from the document image, a connected component corresponding to a background of the document image; generating a histogram of pixel values of the connected component; generating a replacement range using a range pruning algorithm that narrows a range of the histogram by iteratively discarding at least one pixel value and corresponding pixel count of the histogram from at least one side of the histogram; selecting, from the connected component, at least one pixel having a corresponding pixel value within the replacement range; converting the corresponding pixel value of the at least one pixel to a uniform background color; and outputting, subsequent to the converting, the document image.

21 Claims, 9 Drawing Sheets

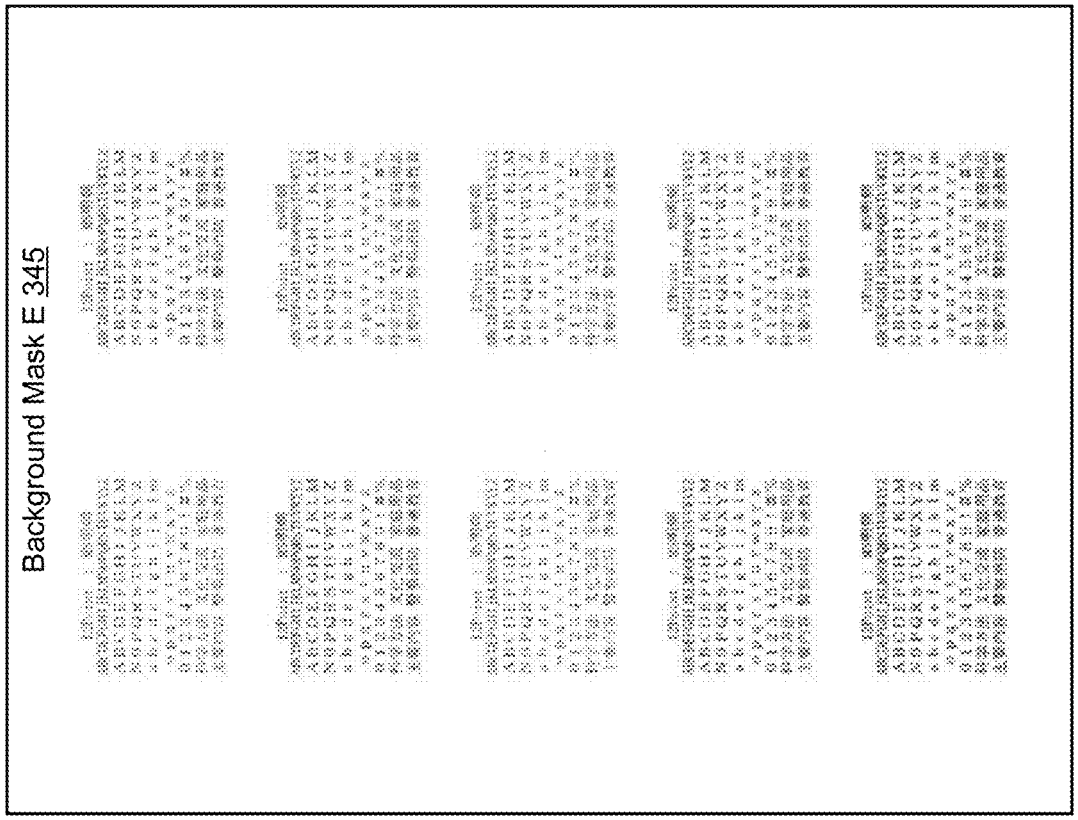
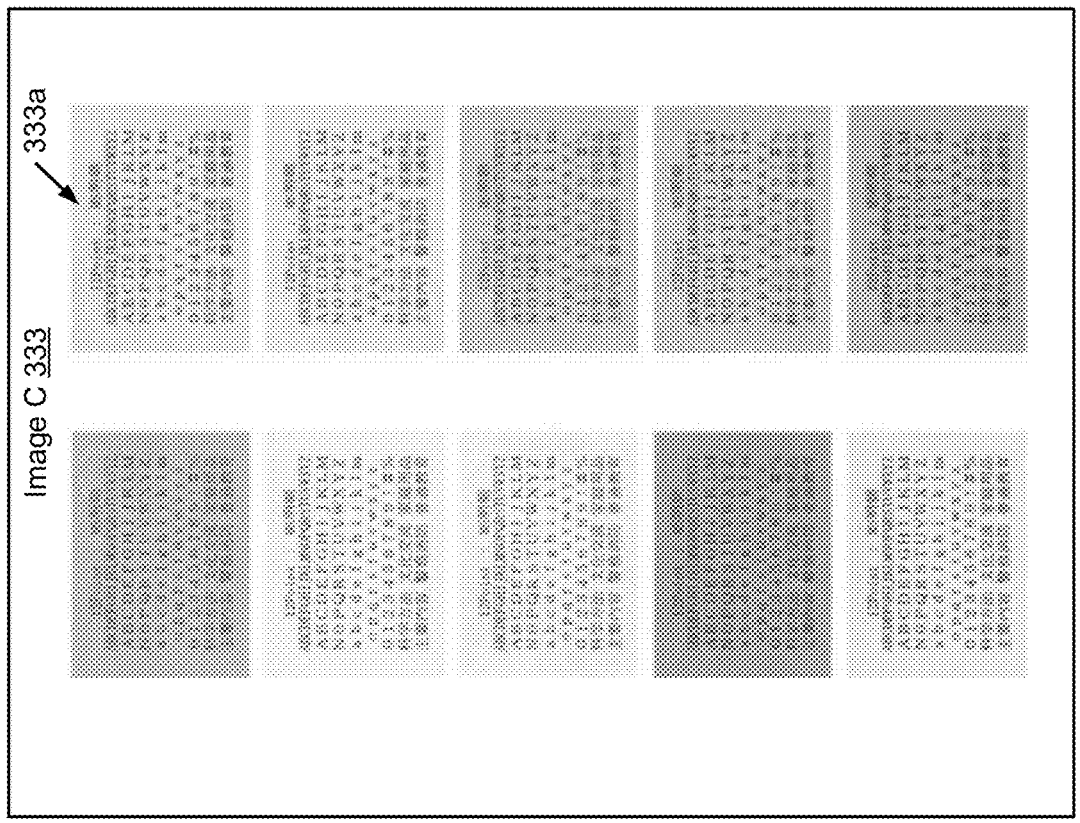
FIG. 3K
FIG. 3J

US 11,330,149 B1

FINDING THE PAGE BACKGROUND COLOR RANGE

BACKGROUND

Document scanners and camera devices capture images of documents (herein referred to as "document images"). In such document images, image noise generated by image sensors and circuitry of the document scanners and camera devices exists as random variation of brightness or color information.

The background of a document image is a portion that excludes data objects (e.g., text, graphics, charts, tables, pictures, and/or other embedded contents) of the document image. Specifically, in document images, the background and the data objects are mutually exclusive portions where the data objects are defined as non-background content. Background noise exists as image noise in the background of these document images.

SUMMARY

In general, in one aspect, the invention relates to a method to reduce background noise in a document image. The method includes: extracting, from the document image, a connected component corresponding to a background of the document image; generating a histogram of pixel values of the connected component; generating a replacement range using a range pruning algorithm that narrows a range of the histogram by iteratively discarding at least one pixel value and corresponding pixel count of the histogram from at least one side of the histogram; selecting, from the connected component, at least one pixel having a corresponding pixel value within the replacement range; converting the corresponding pixel value of the at least one pixel to a uniform background color; and outputting, subsequent to the converting, the document image.

In general, in one aspect, the invention relates to a system for reducing background noise in a document image. The system includes: a memory, and a computer processor connected to the memory. The processor: extracts, from the document image, a connected component corresponding to a background of the document image; generates a histogram of pixel values of the connected component; generates a replacement range using a range pruning algorithm that narrows a range of the histogram by iteratively discarding at least one pixel value and corresponding pixel count of the histogram from at least one side of the histogram; selects, from the connected component, at least one pixel having a corresponding pixel value within the replacement range; converts the corresponding pixel value of the at least one pixel to a uniform background color; and outputs, subsequent to the converting, the document image.

In general, in one aspect, the invention relates to a non-transitory computer readable medium (CRM) storing computer readable instructions for reducing background noise in a document image. The computer readable instructions, when executed by a computer, include functionality for: extracting, from the document image, a connected component corresponding to a background of the document image; generating a histogram of pixel values of the connected component; generating a replacement range using a range pruning algorithm that narrows a range of the histogram by iteratively discarding at least one pixel value and corresponding pixel count of the histogram from at least one side of the histogram; selecting, from the connected component, at least one pixel having a corresponding pixel value within the replacement range; converting the corresponding pixel value of the at least one pixel to a uniform background color; and outputting, subsequent to the converting, the document image.

Other aspects of the invention will be apparent from the following description and the appended claims.

BRIEF DESCRIPTION OF DRAWINGS

FIGS. 3A-3L show an implementation example in accordance with one or more embodiments of the invention.

DETAILED DESCRIPTION

Figure 1:
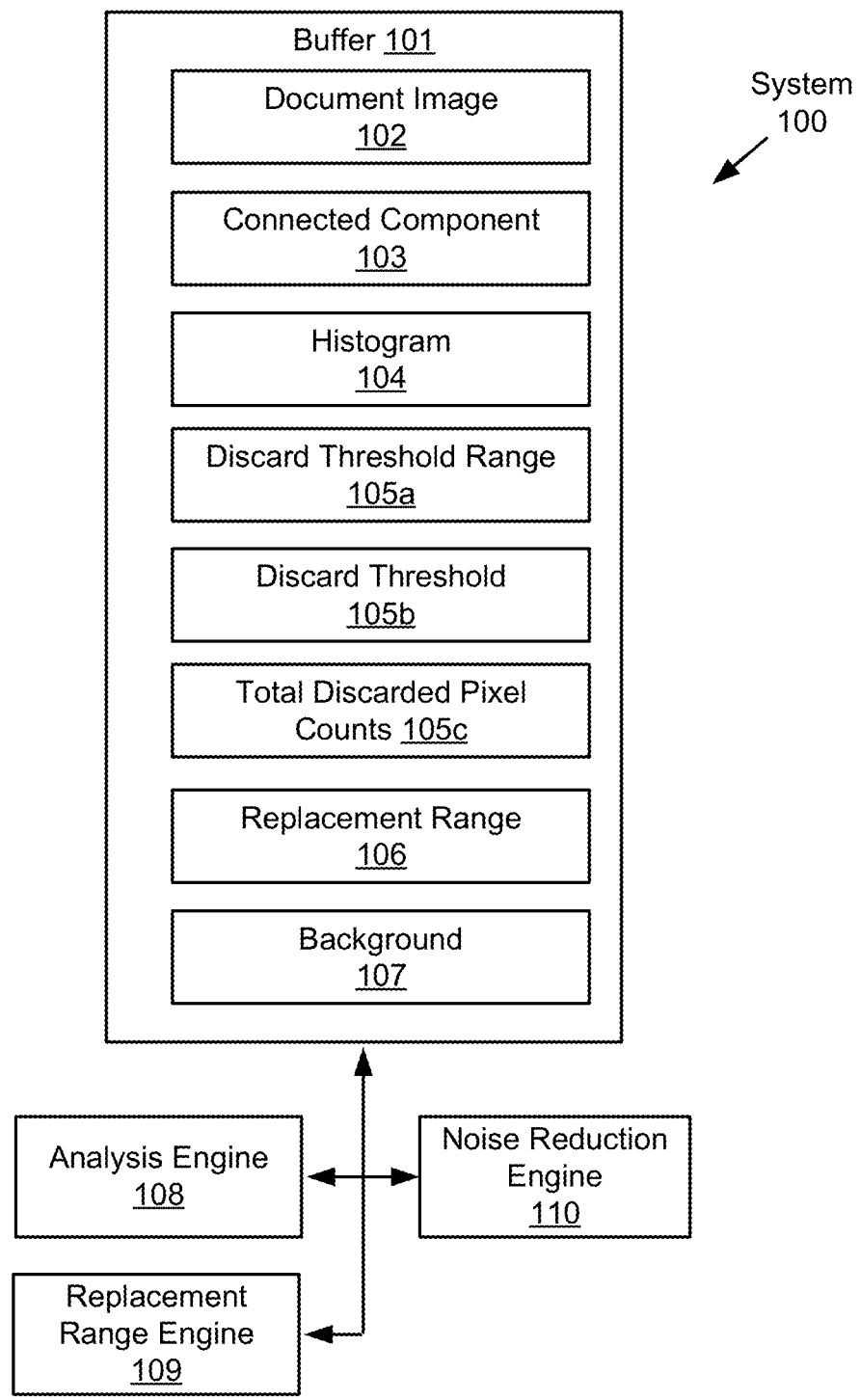
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to determine the page background color range of a document image using a valley-removal and range pruning method to narrow the range of pixel value histogram followed by a pruning method to further narrow the range by discarding small values around the peak of the histogram. In one or more embodiments of the invention, the identified background color (pixel value) range is used to reduce visual background noise in images (especially in images of document pages) in a manner such that noisier backgrounds are more aggressively cleaned than cleaner backgrounds.

FIG. 1 shows a system (100) in accordance with one or more embodiments of the invention. As shown in FIG. 1, the system (100) has multiple components, including, for example, a buffer (101), an analysis engine (108), a replacement range engine (109), and a noise reduction engine (110). Each of these components (101, 108, 109, 110) may be located on the same computing device (e.g., personal computer (PC), laptop, tablet PC, smart phone, multifunction printer, kiosk, server, etc.) or on different computing devices connected by a network of any size having wired and/or wireless segments. In one or more embodiments, these components may be implemented using the computing system (400) described below in reference to FIG. 4. Each of these components is discussed below.

In one or more embodiments, the buffer (101) may be implemented in hardware (i.e., circuitry), software, or any combination thereof. The buffer (101) is configured to store a document image (102). The document image (102) is an image of a physical document and may be captured from a physical document using a camera device or a document scanner. The physical document may include one or more lines of text made up of characters that are hand-written, typed, and/or printed. The physical document may also include non-text objects such as graphics, charts, tables, pictures, and/or other embedded contents.

The document image (102) may be part of a collection of document images that are processed by the system (100) to generate intermediate and final results. Further, the document image (102) may be of any size and in any image format (e.g., BMP, JPEG, TIFF, PNG, etc.). The document image (102) includes one or more foreground objects corresponding to the text, graphics, charts, tables, pictures, and/or other embedded contents of the physical document. All portions of the document image (102) excluding the foreground objects are considered the background of the document image (102). The document image (102) includes certain amounts of image noise, which is a random variation of brightness or color information in the document image (102). The image noise may be produced by the image sensor and circuitry of the document scanner or digital camera used to generate the document image (102). The portion of the image noise present in the background (107) is referred to as background noise.

The buffer (101) is further configured to store the intermediate and final results of the system (100) that are directly or indirectly derived from the document image (102). The intermediate and final results include at least a connected component (103), a histogram (104), a discard threshold range (105a), a discard threshold (105b), a total discarded pixel counts (105c), a replacement range (106), and a background (107), which are described in more detail below.

In one or more embodiments of the invention, the analysis engine (108) may be implemented in hardware (i.e., circuitry), software, or any combination thereof. The analysis engine (108) performs an extraction operation of the document image (102) to extract the connected component (103) corresponding to a background of the document image (102). The connected component (103) is among a number of connected components extracted by the analysis engine (108) from the document image (102). The extraction operation includes a thresholding operation which produces a binary mask, and a connected component analysis operation which takes the binary mask as input and outputs a "label image". The label image identifies connected components on a pixel-by-pixel basis. Each of the connected components is a cluster of pixels with the same label after applying the extraction operation to the document image (102). The thresholding operation generates the binary mask of the document image (102) based on a comparison between the pixel value and a threshold value. For example, the pixels having pixel values greater than or equal to the threshold value are marked in the binary mask while other pixels having pixel values less than the threshold value are unmarked in the binary mask.

The connected component analysis operation analyses the binary mask to identify geometrically contiguous regions of marked pixels. Each geometrically contiguous region of marked pixels within the binary mask is identified as a connected component and assigned a unique label. Specifically, the analysis engine (108) extracts the connected component (103) such that all pixels within the geometrically contiguous region have the same assigned label.

In one or more embodiments of the invention, the analysis engine (108) compares a dimension of the document image (102) to the connected components to generate a comparison result. Accordingly, the connected component (103) is selected, based on the comparison result, from the number of connected components as a connected component that corresponds to the background of the document image (102). For example, the connected component (103) is selected based on closest matching of the height and width of each connected component and that of the document image (102). In other words, the height and width of the connected component (103) match the height and width of the document image (102) with a least amount of difference than any other connected components.

Once the connected component (103) is extracted from the document image (102), the analysis engine (108) generates a histogram (104) of pixel values of the connected component (103). The histogram (104) is a statistical distribution of the pixel values. Specifically, the histogram (104) includes a pixel count for each pixel value present in the connected component (103). Pixel values may correspond to the X-axis of the histogram (104) while the pixel count or occurrences may correspond to the Y-axis of the histogram (104). The pixel count in the histogram (104) for a particular pixel value is the total number of pixels in the connected component (103) that have that particular pixel value. The pixel count is also referred to as the number of occurrences or occurrence values of the corresponding pixel value. The dominant pixel value is the pixel value that corresponds to a maximum pixel count in the histogram (104). In one or more embodiments, the pixel count in the histogram (104) is represented as a percent instead of the actual number of occurrences. In this context, the pixel count may also be referred to as the occurrence percent or pixel count percent. Specifically, the occurrence percent or pixel count percent is the ratio of the number of occurrences (of a particular pixel value) over the total number of pixels in the connected component (103). In mathematical terms, the dominant pixel value is the mode of the histogram (104), and the corresponding pixel count or pixel count percent is referred to as the size of the mode or mode size. The maximum and minimum pixel values in the histogram (104) are referred to as the upper and lower bounds that collectively define the range of the histogram (104). For scenarios where the physical document has a uniform background, the histogram (104) exhibits a well-defined peak shape centered around the mode. Accordingly, the analysis engine (108) identifies the dominant pixel value in the histogram (104) as the uniform background color. In one or more embodiments, the analysis engine (108) performs the functions described above using the method described below in reference to FIG. 2.

In one or more embodiments of the invention, the replacement range engine (109) may be implemented in hardware (i.e., circuitry), software, or any combination thereof. The replacement range engine (109) generates the replacement range (106) based on the discard threshold range (105a), the discard threshold (105b), and the total discarded pixel count (105c). In one or more embodiments, the replacement range engine (109) uses a valley-removal algorithm and a range-pruning algorithm to generate the replacement range (106). The valley-removal algorithm and the range pruning algorithm iteratively discards pixel values from either side of the histogram (104) to remove one or more local minimums (referred to as statistical valleys) of the histogram (104). The replacement range engine (109) generates the discard threshold range (105a) and the total discarded pixel count (105c) based on the mode size of the histogram (104) prior to the iterations of discarding pixel values from the histogram (104). The discard threshold range (105a) is a range of pixel values from which the discard threshold (105b) is selected for each iteration of discarding pixel values. The discard threshold (105b) selected for a current iteration is used to determine whether to terminate the iterations after the current iteration is complete. The total discarded pixel count (105c) is a parameter used to determine how the discard threshold is reduced from the current iteration to the next iteration. In one or more embodiments, the replacement range engine (109) performs the functions described above using the method described below in reference to FIG. 2.

In one or more embodiments, the noise reduction engine (110) may be implemented in hardware (i.e., circuitry), software, or any combination thereof. The noise reduction engine (110) selects, from the connected component (103), any pixel having a pixel value within the upper bound and the lower bound of the replacement range (106). All selected pixels from the connected component (103) collectively form the background (107). In other words, any pixel in the connected component (103) that is not selected by the noise reduction engine (110) is excluded from the background (107). In particular, the unselected pixels are identified as belonging to the foreground objects of the document image (102). To reduce background noise, the noise reduction engine (110) converts the pixel value of each selected pixel to the uniform background color that is identified by the analysis engine (108) above. In other words, the noise reduction engine (110) generates a noise reduced (i.e., cleaned) version of the document image (102) where the noise in the background (107) are replaced by the uniform background color. In the original version of the document image (102), pixels in the background (107) have pixel values varying throughout the replacement range (106). In contrast, in the noised reduced (i.e., cleaned) version of the document image (102), all pixels in the background (107) have the same pixel value that corresponds to the uniform background color. In one or more embodiments, the noise reduction engine (110) performs the functions described above using the method described below in reference to FIG. 2.

Although the system (100) is shown as having four components (101, 108, 109, 110), in one or more embodiments of the invention, the system (100) may have more or fewer components. Furthermore, the functions of each component described above may be split across components. Further still, each component (101, 108, 109, 110) may be utilized multiple times to carry out an iterative operation.

Figure 2:
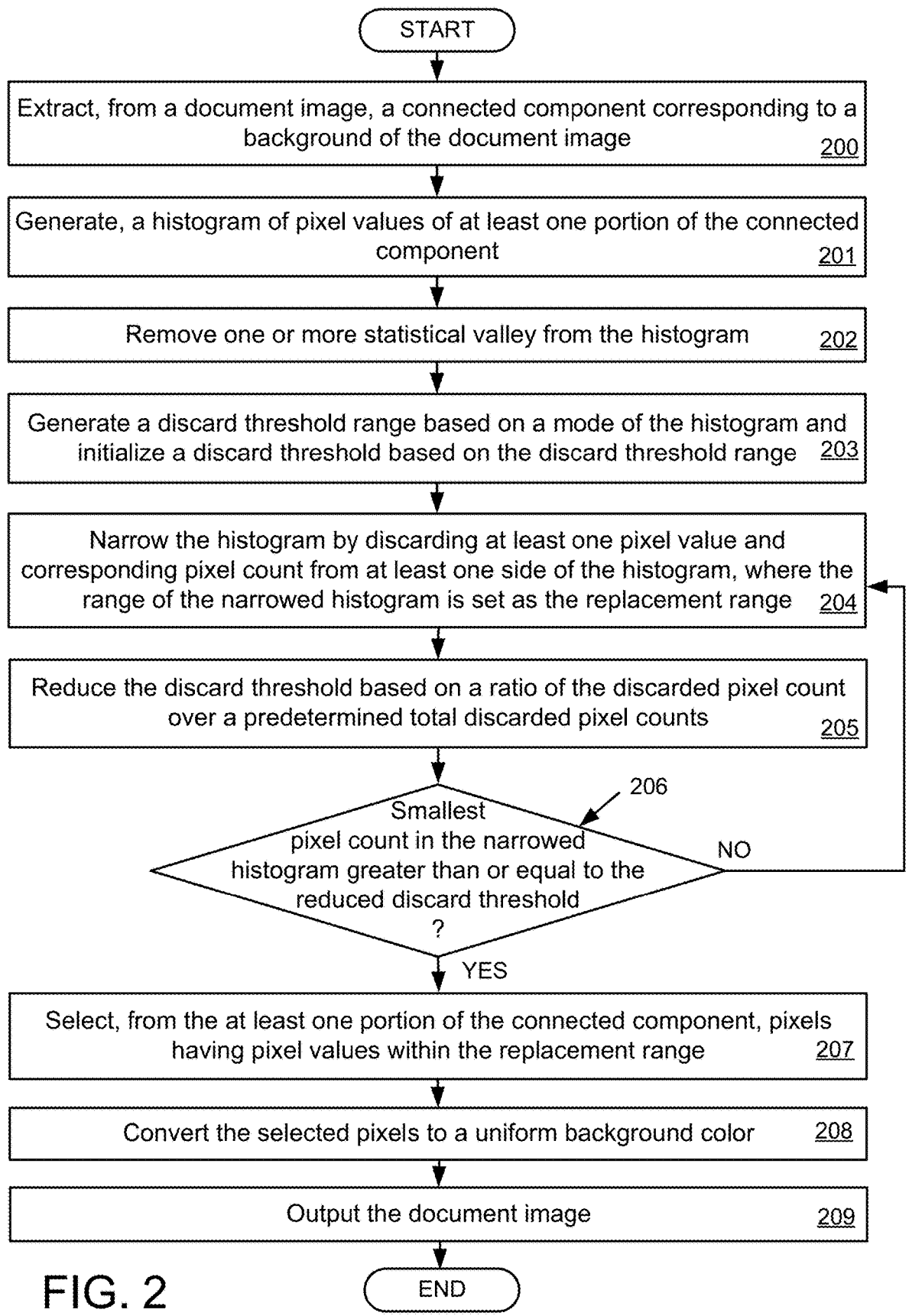
FIG. 2 shows a flowchart in accordance with one or more embodiments of the invention.

FIG. 2 shows a flowchart in accordance with one or more embodiments of the invention. One or more of the steps in FIG. 2 may be performed by the components of the system (100), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 200, according to one or more embodiments, a connected component corresponding to a background of the document image is extracted from the document image by a computer processor. In one or more embodiments, a number of connected components are first extracted from the document image. The connected component corresponding to the background is selected from these connected components based on a comparison result of comparing a dimension of the document image to each of the connected components. The particular connected component that has closest match to the dimension (e.g., height and width) of the document image is selected as corresponding to the background.

The connected component having close match to the dimension (e.g., height and width) of the document image is readily identifiable when the background is a single color, with the exception of the noise. When a natural image constitutes the background, the connected component corresponding to the entire background, including the natural image, may not be found. In such case, no background color is determined and not background noise reduction is performed as it is advantageous to leave the natural image alone without noise reduction. Specifically, subsequent Steps 201 through 207 are omitted when the connected component corresponding to the entire background is not found.

In Step 201, a histogram of pixel values of at least one portion of the connected component (as selected above in Step 200) is generated by the computer processor. In one or more embodiments, the histogram includes all pixels of the connected component. In such embodiments, Steps 201 through 206 are performed once to reduce the background noise. Alternatively, the connected component may be divided into multiple portions where the histogram includes pixels of one portion of the connected component. In such alternative embodiments, Steps 201 through 207 may be iteratively performed to reduce the background noise in each of the portions of the connected component.

In Step 202, one or more statistical valley is removed from the histogram.

In Step 203, a discard threshold range is generated based on a mode of the histogram such that a larger mode size results in a larger discard threshold range. Further, a discard threshold is initialized based on the discard threshold range. As a result of the larger mode size, a narrower replacement range surrounding the mode is generated by discarding more pixel values from the histogram based on the larger discard threshold range. Conversely for a smaller mode size, a wider replacement range surrounding the mode is generated by discarding less pixel values from the histogram based on the smaller discard threshold range. In one or more embodiments, the discard threshold range is set based on an exponential function of the mode size (i.e., the pixel count percent of the mode) of the histogram, and the discard threshold is initialized as the upper bound of the discard threshold range.

In Step 204, the histogram is narrowed by discarding at least one pixel value and corresponding pixel count of the histogram from at least one side of the histogram. The range of the narrowed histogram is set as the replacement range. In one or more embodiments, the histogram is narrowed from the side with the smaller pixel count of the two sides. For example, one or more consecutive pixel values within a step size from the upper bound of the histogram are discarded if the pixel count at the upper bound of the histogram is smaller than the pixel count at the lower bound of the histogram. Conversely, one or more consecutive pixel values within the step size from the lower bound of the histogram are discarded if the pixel count at the lower bound of the histogram is smaller than the pixel count at the upper bound of the histogram. In one or more embodiments, the step size equals to 1 in pixel value such that the histogram is narrowed by 1 in pixel value for each iteration of Step 204 through Step 206. In other words, the range of the histogram is reduced by 1 in pixel value in each iteration. Accordingly, the replacement range is reduced by 1 in pixel value.

In Step 205, the discard threshold is reduced based on a ratio of a pixel count discarded in Step 204 over a predetermined total discarded pixel count. In one or more embodiments, the pixel count in the histogram is recorded as a percent (i.e., pixel count percent) and the predetermined total discarded pixel count (expressed in pixel count percent) is set based on a logarithmic function of the mode size of the histogram. For a histogram with a larger mode size, the discard threshold is reduced slower from one iteration to the next iteration such that more iterations are allowed based on the determination in Step 206 below to result in a narrower replacement range. Conversely, for a histogram with a smaller mode size, the discard threshold is reduced faster from one iteration to the next iteration such that less iterations are allowed based on the determination in Step 206 below to result in a wider replacement range.

In Step 206, a determination is made as to whether the smallest pixel count in the narrowed histogram is greater than or equal to the reduced discard threshold. If the determination is positive, i.e., the smallest pixel count in the narrowed histogram is greater than or equal to the reduced discard threshold, the method proceeds to Step 207. If the determination is negative, i.e., the smallest pixel count in the narrowed histogram is less than the reduced discard threshold, the method returns to Step 204 to perform the next iteration of narrowing the replacement range.

In Step 207, pixels having pixel values within the replacement range are selected from the at least one portion of the connected component. In the embodiments where the histogram includes all pixels of the connected component, the selected pixels collectively form the background of the document image. In the embodiments where the connected component is divided into multiple portions where the histogram includes pixels of one portion of the connected component, the selected pixels are iteratively added into the background.

In one or more embodiments, subsequent to narrowing the replacement range in Step 203 through Step 206 and prior to the Step 207 above, any pixel value with probability less than a minimum threshold (e.g., 0.001) are discarded from the replacement range. Accordingly, the replacement range is modified by discarding pixel values within the replacement range that have pixel count percent less than the minimum threshold (e.g., 0.001). Specifically, starting with pixel values at the upper and lower bounds of the replacement range and working toward the dominant pixel value (i.e., mode), stopping when the first pixel value is encountered with a pixel count percent greater than or equal to the minimum threshold (e.g., 0.001). Starting from the upper bound toward the mode, the first pixel value with a pixel count percent greater than or equal to the minimum threshold (e.g., 0.001) is used as the modified upper bound. Similarly, starting from the lower bound toward the mode, the first pixel value with a pixel count percent greater than or equal to the minimum threshold (e.g., 0.001) is used as the modified lower bound. By discarding pixel values with low pixel count percents, the replacement range is further reduced to the width defined by the modified upper and lower bounds.

In Step 208, pixel values of the selected pixels are converted to a uniform background color that is identified as the background color. In one or more embodiments, a dominant pixel value associated with the mode in the histogram of pixel values is identified as the uniform background color.

In Step 209, the document image is outputted. In particular, the background noise pixels are converted to the uniform background color in the outputted document image. The document image may be outputted using a display device, a printer, or other suitable device of a user.

FIGS. 3A-3L show an implementation example in accordance with one or more embodiments of the invention. The implementation example shown in FIGS. 3A-3L is based on the system and method flowchart described in reference to FIGS. 1 and 2 above. In one or more embodiments of the invention, one or more elements shown in FIGS. 3A-3L may be omitted, repeated, and/or organized in a different arrangement. Accordingly, the scope of the invention should not be considered limited to the specific arrangement of elements shown in FIGS. 3A-3L.

In the example shown in FIGS. 3A-3L below, the document image is the image of a single page document. Removing noise from the background of the document image improves quality (e.g., legibility) of the document image and, as a result, quality of the printed or displayed outputs generated from the document image. As described above, the background noise corresponds to pixel values which differ from the dominant pixel value of the image background. Reducing background noise is by setting pixels which are determined as corresponding to "noise" to the dominant pixel value of the image background that results in a uniform background color.

A first task to remove background noise is to identify the background itself, i.e., distinguishing the (possibly noisy) background from non-background content. This can be especially challenging when dealing with images of document pages, such as scans of Microsoft Office documents or of PDFs, because of the variety of content which may be present on the document pages. For example, a document page may contain text of varying sizes, font styles, and colors, shapes with a variety of fills, tables, and natural images (i.e., photographs of real-world scenes). This wide diversity of content types manifests as a wide diversity of visual features, effectively producing a very complex description of content.

Distinguishing background noise from natural images is especially difficult due to the irregular pixel patterns (resembling noise) contained within natural images. Improperly applying noise reduction techniques to a document image containing natural images may degrade the natural image content.

Some document images contain more background noise than others. In the example below, the amount of noise reduction applied varies according to the amount of noise present in the document image. For example, larger extent of noise reduction is applied to noisier images to effectively reduce/remove the noise, while lesser extent of noise reduction is applied to cleaner images without degrading image content. The tradeoff is made to leave some noise in the document image instead of removing all the noise but, in the process, destroying meaningful content of the document image.

The amount of noise present in the document image is determined by the width of the distribution (e.g., histogram) of background color values. A narrower distribution indicates a cleaner image where less noise reduction is to be performed. In contrast, a wider distribution (i.e., with larger range of color values) indicates a dirtier image where more noise reduction is to be performed. Since noise reduction means overwriting the pixel values which fall within a specified replacement range with a uniform background color, "more noise reduction" equates to increasing the size of that range, i.e., replacing more color values with the uniform background color.

In the example workflow described below, a narrower replacement range is generated for a document image with a narrower background pixel-occurrence distribution, i.e., more tightly focused on a mode of the distribution with a larger mode size, and a wider replacement range is generated for a document image with wider pixel-occurrence distributions, i.e., less tightly focused on a mode of the distribution with a smaller mode size. The example workflow is organized as Step 1 through Step 4 described below.

In Step 1, a page background connected component (page background CC) is generated by examining the geometry of all connected components (CCs) of the document image. Accordingly, a histogram of pixel-occurrences is generated that indicates the number of occurrences for each pixel value present in the page background CC.

In Step 2, the initial page background color range (i.e., initial replacement range) is set to the full range of the histogram.

In Step 3, the replacement range is narrowed by removing statistical valleys from one or both sides of the replacement range.

In Step 4, the replacement range is further narrowed by pruning away pixel values with a small number of occurrences from one or both sides of the replacement range.

Note that pixels outside of the page background CC may have pixel values within the final replacement range. Further, not all pixels of the page background CC may have pixel values within the final replacement range. In other words, some pixel of the page background CC may have pixel values outside of the final replacement range.

Figure 3A:
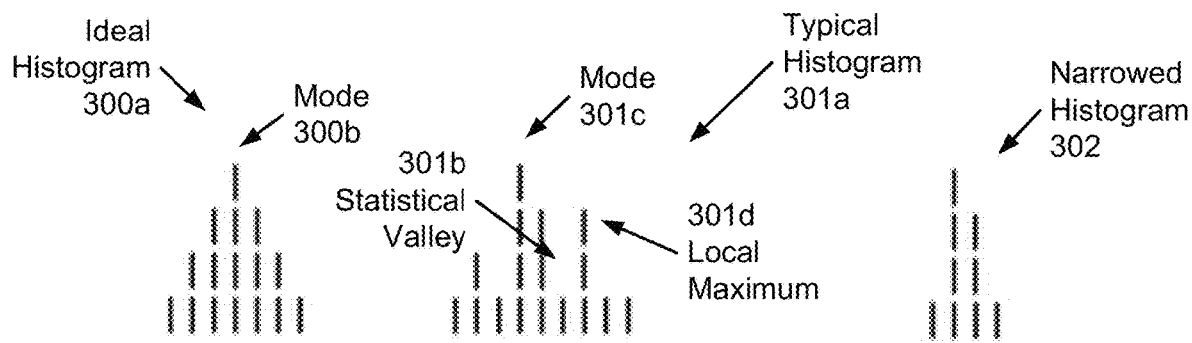

More specifically, in Step 3, removing valleys is based on the notion that an ideal replacement range would have a form consisting of a single high point having the largest occurrence value (i.e., the mode), with the occurrence values on either side of the mode gradually diminishing as the distance from the mode along the X-axis increases. In reality, the initial replacement range may include statistical valleys that are removed by the valley-removal algorithm to generate a narrowed replacement range. The valley-removal algorithm may include a built-in tolerance level that allows some irregularity to persist after valley removal is complete. For example, the final replacement range may include statistical valleys that do not exceed a depth threshold. FIG. 3A shows an example ideal histogram (300a) having a mode (300b), a typical histogram (301a) where a statistical valley (301b) is formed between a mode (301c) and a local maximum (301d), and a narrowed histogram (302) that is generated by applying the valley-removal algorithm to the typical histogram (301a).

In Step 4, pruning the replacement range is to narrow the range from one or both sides of the range by pruning away pixel values with a small number of occurrences (i.e., pixel counts). The narrowed replacement range includes, at minimum, the mode of the initial replacement range.

In an example range pruning algorithm, a main loop iteratively narrows the replacement range by moving a left (lower) boundary or a right (upper) boundary, referred to as the left iterator and the right iterator, respectively, of the replacement range in each iteration. In performing Step 4 of the workflow, the main loop walks the left or right iterator from the left and right sides, respectively, of the replacement range along the X-axis (corresponding to pixel values) of the histogram towards the mode, stepping over pixel values in the range which have small occurrence (i.e., pixel count) percents. For example, a constant step size, such as 1 in pixel value per step may be used for incrementing or decrementing pixel values. In other words, in each iteration, the left iterator is incremented by 1 in pixel value or the right iterator is decremented by 1 in pixel value. The iterator which is modified is the one referring to the smallest number of occurrences. In each iteration, the current stepped-over pixel values are discarded from the current narrowed replacement range. The term "current" refers to the current iteration.

The main loop stops iteration when one of the following conditions is met:

Condition 1: The left and right iterators equal the mode.

Condition 2: The current smallest pixel count percent of the histogram in the current narrowed replacement range is greater than or equal to a maximum value, referred to as discard_threshold of the current iteration, or current discard_threshold. The discard_threshold is initialized to the maximum of the discard_threshold_range and is updated with each iteration, after modifying either the left or right iterator. In particular, the current discard_threshold is determined in each iteration after the left or right iterator is incremented or decrement. The discard_threshold and the discard_threshold_range are examples of the discard threshold (105b) and the discard threshold range (105a) depicted in FIG. 1 above.

The range pruning algorithm iteratively moves through a range of discard thresholds, referred to as the discard_threshold_range, from its maximum to its minimum, selecting the current discard_threshold as the value corresponding to its current position in the discard_threshold_range. The position is calculated by Eq. 1 below that shifts towards the discard_threshold_range's minimum as the algorithm progresses from one iteration to the next iteration. In Eq. 1, the dicarded_value is the pixel count percent of the discarded pixel value, and the maximum_to_prune is a constant, set relative to the pixel count percent of the mode of the histogram. The shifted amount depends upon the pixel count percent (pixel count/total number of pixels) of the discarded pixel value of the current iteration (i.e., current discarded pixel value), divided by the constant maximum_to_prune, which defines the maximum sum of pixel count percents to discard before "position" is no longer decreased. In other words, when discarded_value>=maximum_to_prune, position becomes 0 and no longer decreases. Position can equal 0 before the main loop stops iteration. The maximum_to_prune in Eq. 1 below is an example of the total discarded pixel counts (105c) depicted in FIG. 1 above.

$$\text{position} = \max(0.0, \text{position} - (\text{discarded\_value}/\text{maximum\_to\_prune})) \quad \text{Eq. 1}$$

The range pruning algorithm iteratively moves through the discard_threshold_range at a rate inversely relative to the dominant peak (i.e., the mode size of the histogram). Based on Eq. 1, a higher dominant peak or larger mode size in the histogram results in a narrower final replacement range. Conversely, a lower dominant peak or smaller mode size in the histogram results in a wider final replacement range. In particular, a narrower replacement range is achieved by reducing the discard_threshold more slowly, from iteration to iteration through the discard_threshold_range, such that more pixel values in the histogram are discarded before terminating the iterations of the range pruning algorithm. Conversely, a wider replacement range is achieved by reducing the discard_threshold more quickly, from iteration to iteration through the discard_threshold_range, such that less pixel values in the histogram are discarded before terminating the iterations of the range pruning algorithm.

Regardless of the size of the mode, as the range pruning algorithm moves along from the ends of the initial replacement range towards the mode, the discarded pixel count percent values start increasing toward the dominant peak of the histogram, and the total remaining pixel count percent in the narrowed replacement range within the histogram in the ever-narrowing range becomes smaller and smaller. The discarding is stopped in the range pruning algorithm before the narrowed replacement range becomes too small. Specifically, the discard_threshold is decreased as the iterations proceed, making it more likely with each iteration that the main loop will stop iterating. The rate to decrease the discard_threshold increases as the size of the pixel count percent values being discarded increases, but is inverse to the pixel count percent of the mode in the histogram.

The changing discard_threshold makes a significant difference when many consecutive pixel values in the histogram have very similar occurrence percent values. As consecutive pixel values having very similar occurrence percent values are discarded, the range pruning algorithm becomes progressively less likely to discard the remaining pixel values that have very similar occurrence percent values and are consecutive to the discarded pixel values.

Figure 3B:
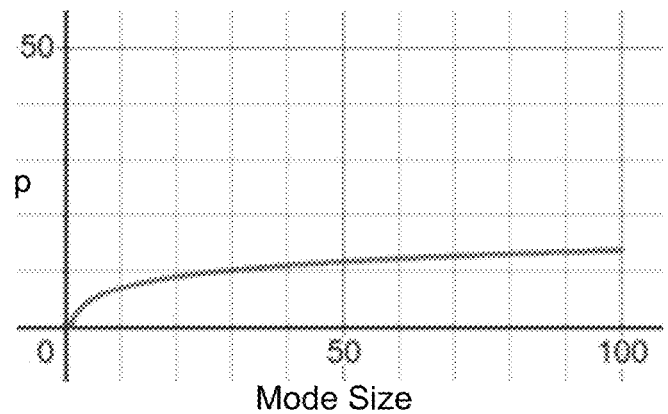

As noted above, maximum_to_prune is the maximum total occurrence values to prune before "position" reaches its minimum (i.e., 0). Prior to executing the main loop of the range pruning algorithm, the maximum_to_prune may be selected as a logarithmic function of the occurrence percent of the mode in the histogram. Any sort of linear relationship performs poorly. Based on the logarithmic function, maximum_to_prune values track small mode sizes closely, but then fall behind quickly as the mode sizes increase. With log base 1.4, a mode of 100% (maximum) maps to a maximum_to_prune of ~13.7%. FIG. 3B shows an example logarithmic relationship according to Eq. 2 below.

$$p = \max(\log_{1.4}(S), 0) \qquad \text{Eq. 2}$$

In Eq. 2, p is the maximum_to_prune corresponding to the vertical axis in FIG. 3B, and S is the mode size in the range [0,100] (i.e., from 0% to 100%) corresponding to the horizontal axis in FIG. 3B. In FIG. 3B, 100 in the horizontal axis corresponds to 100% in the pixel count percent of the mode. As shown in FIG. 3B, a larger mode size corresponds to a larger maximum_to_prune or more iterations to move through the discard_threshold_range with more pixel values being discarded to result in a narrower final replacement range. Accordingly, the replacement range size narrows quickly as the mode size increases from the minimum, but soon narrows slowly as the mode size increases beyond a small magnitude.

Figure 3C:
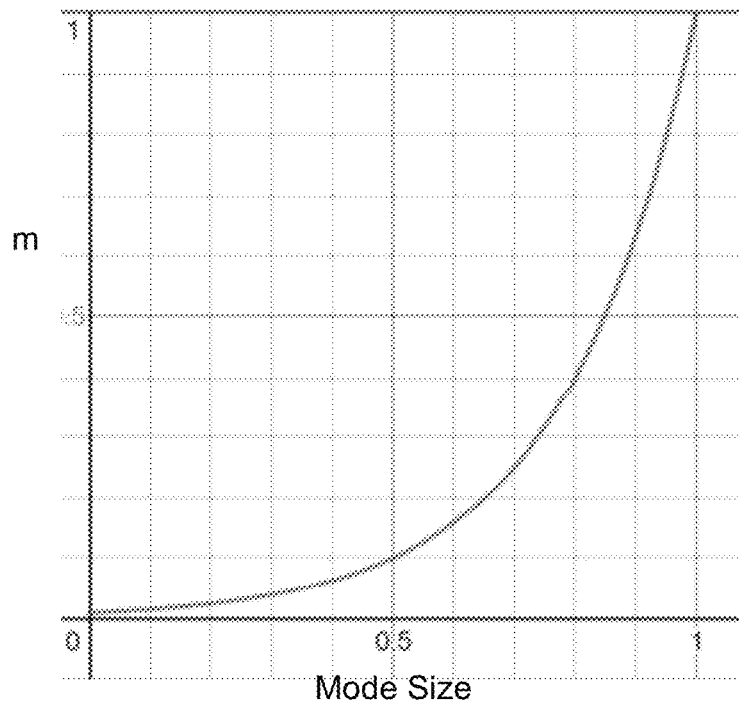

The minimum of the discard_threshold_range may be selected empirically. For example, the minimum of the discard_threshold_range may be set as 0.001. The maximum of the discard_threshold_range may be determined based on the pixel count percent of the mode in the histogram. FIG. 3C shows an example discard_threshold_range as a function of the mode size. In FIG. 3B, 1 in the horizontal axis corresponds to 100% in the pixel count percent of the mode. The function is represented by Eq. 3 below.

$$m = (100^S / 100) * b \qquad \text{Eq. 3}$$

In Eq. 3, m is the maximum pixel count percent of the discard_threshold_range (referred to as the range max) corresponding to the vertical axis in FIG. 3C, S is the mode size (occurrence percent) in the range [0,1] corresponding to the horizontal axis in FIG. 3C, and b is an empirically selected base value (e.g., 0.1). When the mode size S is a maximum value of 1, i.e., the mode consumes 100% of all pixel-occurrences, m equals to b resulting in the range max being 100% of the empirically selected base value b. As the mode size S decreases from the maximum, m initially decreases much faster. As the mode size S approaches 0, m approaches 1% of the empirically selected base value b.

As shown in FIG. 3C, a larger mode size corresponds to a wider discard_threshold_range such that more pixel values are discarded resulting in a narrower final replacement range.

An example code of the valley-removal algorithm described above is listed in TABLE 1 below.

TABLE 1

```
InclusiveRange<PixelValue> prune_range(
    const InclusiveRange<PixelValue>& full_range,
    const PixelValue&mode,
    const PixelValueOccurrences<Percent>& pvos)
{
    auto left_iterator = pvo_get_iterator(pvos, full_range.first);
    auto right_iterator = pvo_get_iterator(pvos, full_range.last);
    const auto mode_iterator = pvo_get_iterator(pvos, mode);
    assert(left_iterator->first <= right_iterator->first);
    // if the left_iterator and right_iterator are equal, they must both
    // refer to the mode
    assert(left_iterator != right_iterator ||
        left_iterator == mode_iterator);
    const auto get_smallest = [&] {
        return left_iterator->second < right_iterator->second ? left_iterator : right_iterator;
    };
    // Calculate the maximum total occurrence values to prune.
    const double maximum_to_prune = [&] {
        // calc log base 1.4 of the occurrence percentage of the mode
        auto max_to_prune = std::log(100 * mode_iterator->second) /
            std::log(1.4);
        max_to_prune = std::max(0.0, max_to_prune);
        max_to_prune = std::min(100.0, max_to_prune); // not actually needed w/ log base 1.4
        return max_to_prune / 100.0;
    }( );
    // discard_threshold_range dictates the range of occurrence values which
    // may be discarded.
    const auto discard_threshold_range = [&] {
        const auto dtr_min = 0.001;
        const auto dtr_max_base_percent = std::pow(100, mode_iterator->second) / 100.0;
        const auto dtr_max_base = 0.1;
        const auto dtr_max = std::max(dtr_min, dtr_max_base_percent * dtr_max_base);
        return InclusiveRange<double>{dtr_min, dtr_max};
    }( );
    const double dtr_width = discard_threshold_range.last -
        discard_threshold_range.first;
```

TABLE 1-continued

```
    double dtr_position = 1; // 1.0 corresponds to max of discard_threshold_range
    const auto get_discard_threshold = [&] {
      return discard_threshold_range.first + (dtr_width * dtr_position);
    };
    while (true) {
      const auto discard_threshold = get_discard_threshold( );
      const auto smallest_occurrence = get_smallest( )->second;
      if (left_iterator == right_iterator || // both equal the mode; never prune the mode
          smallest_occurrence >= discard_threshold) {
        const auto r = InclusiveRange<PixelValue>{left_iterator->first,
                       right_iterator->first};
        return r;
      }
      if (left_iterator->second < right_iterator->second) {
        // left can't be mode, because value of left is less than that of right, and
        // nothing can have larger value than mode, by definition
        assert(left_iterator != mode_iterator);
        ++left_iterator;
      }
      else if (right_iterator->second < left_iterator->second) {
        // right can't be mode, because value of right is less than that of left, and
        // nothing can have larger value than mode, by definition
        assert(right_iterator != mode_iterator);
        --right_iterator;
      }
      else {
        assert(left_iterator != right_iterator); // already established, above
        if (left_iterator != mode_iterator) {
          ++left_iterator;
        }
        else {
          --right_iterator;
        }
      }
      dtr_position = std::max(0.0, dtr_position - (smallest_occurrence / maximum_to_prune));
    }
  }
}
```

Figure 3E:
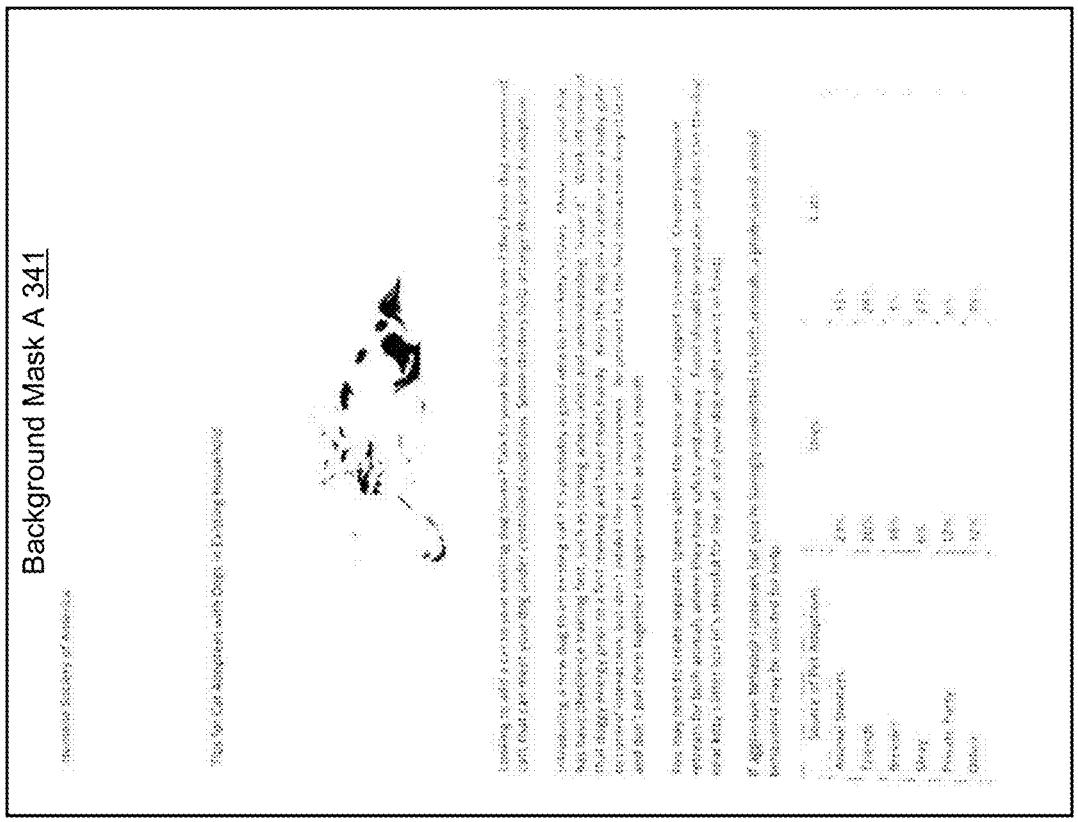
Figure 3D:
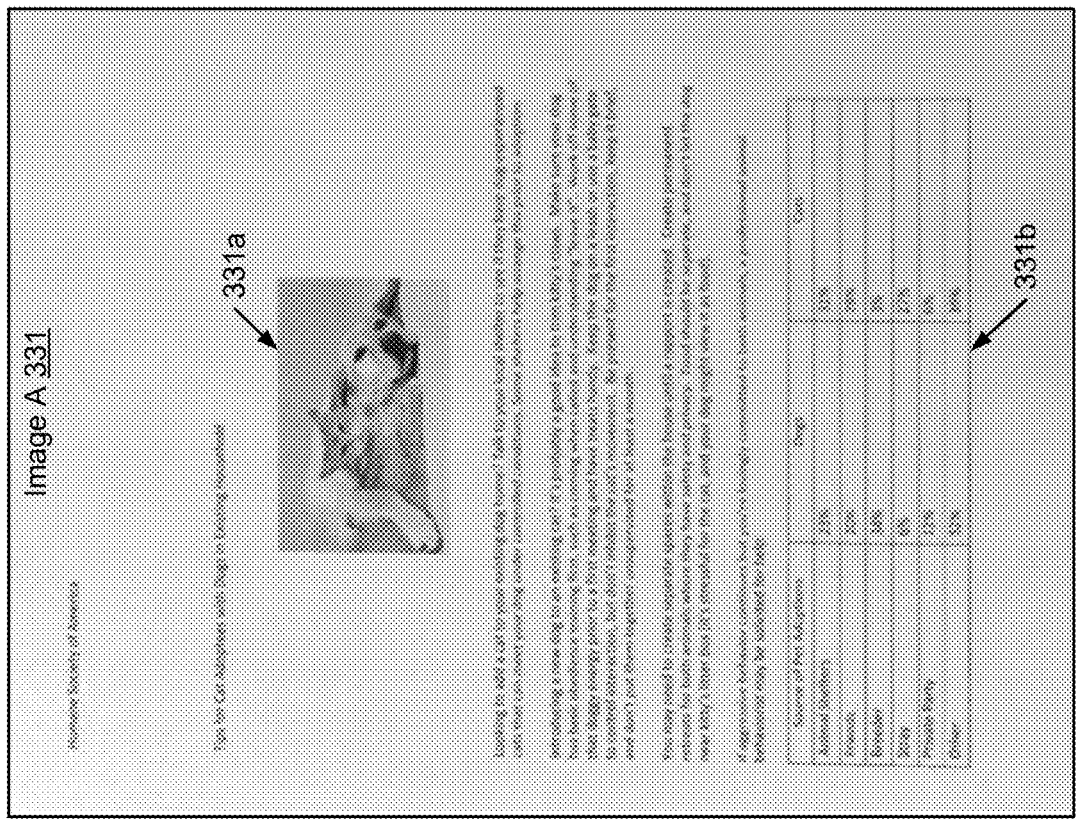

FIG. 3D shows an image A (331), which is an example of the document image (102) depicted in FIG. 1 above. The image A (331) includes a natural image (331a) and a data table (331b). TABLE 2 below shows an example histogram of the image A (331). The first column in TABLE 2 corresponds to lightness values of the pixels in the background CC of the image A (331). The second column in TABLE 2 corresponds to the pixel counts or the number of occurrences. The third column in TABLE 2 corresponds to the pixel count percent or occurrence percent.

TABLE 2

| PIXEL VALUE | # OCCURRENCES | PERCENT [0, 1] |
|---|---|---|
| 116 | 2 | 9.62E−07 |
| 117 | 1 | 4.81E−07 |
| 118 | 1 | 4.81E−07 |
| 119 | 3 | 1.44E−06 |
| 120 | 2 | 9.62E−07 |
| 121 | 1 | 4.81E−07 |
| 122 | 3 | 1.44E−06 |
| 123 | 7 | 3.37E−06 |
| 124 | 3 | 1.44E−06 |
| 125 | 3 | 1.44E−06 |
| 126 | 6 | 2.89E−06 |
| 127 | 7 | 3.37E−06 |
| 128 | 7 | 3.37E−06 |
| 129 | 5 | 2.41E−06 |
| 130 | 4 | 1.92E−06 |
| 131 | 5 | 2.41E−06 |
| 132 | 16 | 7.70E−06 |
| 133 | 9 | 4.33E−06 |
| 134 | 34 | 1.64E−05 |
| 135 | 23 | 1.11E−05 |
| 136 | 51 | 2.45E−05 |

TABLE 2-continued

| PIXEL VALUE | # OCCURRENCES | PERCENT [0, 1] |
|---|---|---|
| 137 | 26 | 1.25E−05 |
| 138 | 45 | 2.17E−05 |
| 139 | 21 | 1.01E−05 |
| 140 | 45 | 2.17E−05 |
| 141 | 43 | 2.07E−05 |
| 142 | 60 | 2.89E−05 |
| 143 | 62 | 2.98E−05 |
| 144 | 71 | 3.42E−05 |
| 145 | 86 | 4.14E−05 |
| 146 | 83 | 3.99E−05 |
| 147 | 117 | 5.63E−05 |
| 148 | 124 | 5.97E−05 |
| 149 | 170 | 8.18E−05 |
| 150 | 183 | 8.81E−05 |
| 151 | 197 | 9.48E−05 |
| 152 | 241 | 1.16E−04 |
| 153 | 269 | 1.29E−04 |
| 154 | 307 | 1.48E−04 |
| 155 | 323 | 1.55E−04 |
| 156 | 344 | 1.66E−04 |
| 157 | 398 | 1.92E−04 |
| 158 | 426 | 2.05E−04 |
| 159 | 451 | 2.17E−04 |
| 160 | 444 | 2.14E−04 |
| 161 | 472 | 2.27E−04 |
| 162 | 549 | 2.64E−04 |
| 163 | 603 | 2.90E−04 |
| 164 | 590 | 2.84E−04 |
| 165 | 653 | 3.14E−04 |
| 166 | 669 | 3.22E−04 |
| 167 | 669 | 3.22E−04 |
| 168 | 744 | 3.58E−04 |
| 169 | 684 | 3.29E−04 |
| 170 | 793 | 3.82E−04 |

TABLE 2-continued

| PIXEL VALUE | # OCCURRENCES | PERCENT [0, 1] |
|---|---|---|
| 171 | 876 | 4.22E−04 |
| 172 | 1167 | 5.62E−04 |
| 173 | 1509 | 7.26E−04 |
| 174 | 1774 | 8.54E−04 |
| 175 | 1887 | 9.08E−04 |
| 176 | 1807 | 8.69E−04 |
| 177 | 1941 | 9.34E−04 |
| 178 | 2106 | 1.01E−03 |
| 179 | 2191 | 1.05E−03 |
| 180 | 2375 | 1.14E−03 |
| 181 | 2329 | 1.12E−03 |
| 182 | 2341 | 1.13E−03 |
| 183 | 2423 | 1.17E−03 |
| 184 | 2506 | 1.21E−03 |
| 185 | 2041 | 9.82E−04 |
| 186 | 1688 | 8.12E−04 |
| 187 | 1372 | 6.60E−04 |
| 188 | 1207 | 5.81E−04 |
| 189 | 1103 | 5.31E−04 |
| 190 | 1110 | 5.34E−04 |
| 191 | 1189 | 5.72E−04 |
| 192 | 1190 | 5.73E−04 |
| 193 | 1196 | 5.75E−04 |
| 194 | 1165 | 5.61E−04 |
| 195 | 1193 | 5.74E−04 |
| 196 | 1248 | 6.01E−04 |
| 197 | 1240 | 5.97E−04 |
| 198 | 1345 | 6.47E−04 |
| 199 | 1713 | 8.24E−04 |
| 200 | 2108 | 1.01E−03 |
| 201 | 2174 | 1.05E−03 |
| 202 | 2294 | 1.10E−03 |
| 203 | 2662 | 1.28E−03 |
| 204 | 3133 | 1.51E−03 |
| 205 | 3308 | 1.59E−03 |
| 206 | 3266 | 1.57E−03 |
| 207 | 3339 | 1.61E−03 |
| 208 | 2906 | 1.40E−03 |
| 209 | 2416 | 1.16E−03 |
| 210 | 2436 | 1.17E−03 |
| 211 | 2703 | 1.30E−03 |
| 212 | 4975 | 2.39E−03 |
| 213 | 14009 | 6.74E−03 |
| 214 | 35345 | 1.70E−02 |
| 215 | 60078 | 2.89E−02 |
| 216 | 64797 | 3.12E−02 |
| 217 | 53872 | 2.59E−02 |
| 218 | 48549 | 2.34E−02 |
| 219 | 48355 | 2.33E−02 |
| 220 | 54424 | 2.62E−02 |
| 221 | 65930 | 3.17E−02 |
| 222 | 69403 | 3.34E−02 |
| 223 | 70846 | 3.41E−02 |
| 224 | 69797 | 3.36E−02 |
| 225 | 68384 | 3.29E−02 |
| 226 | 69863 | 3.36E−02 |
| 227 | 73380 | 3.53E−02 |
| 228 | 70861 | 3.41E−02 |
| 229 | 66502 | 3.20E−02 |
| 230 | 64447 | 3.10E−02 |
| 231 | 64532 | 3.11E−02 |
| 232 | 70020 | 3.37E−02 |
| 233 | 75904 | 3.65E−02 |
| 234 | 78571 | 3.78E−02 |
| 235 | 76318 | 3.67E−02 |
| 236 | 68480 | 3.30E−02 |
| 237 | 65148 | 3.13E−02 |
| 238 | 55890 | 2.69E−02 |
| 239 | 54780 | 2.64E−02 |
| 240 | 48563 | 2.34E−02 |
| 241 | 38334 | 1.84E−02 |
| 242 | 34542 | 1.66E−02 |
| 243 | 40396 | 1.94E−02 |
| 244 | 37816 | 1.82E−02 |
| 245 | 36557 | 1.76E−02 |
| 246 | 26562 | 1.28E−02 |
| 247 | 19992 | 9.62E−03 |
| 248 | 10523 | 5.06E−03 |
| 249 | 5665 | 2.73E−03 |
| 250 | 2866 | 1.38E−03 |
| 251 | 1207 | 5.81E−04 |
| 252 | 457 | 2.20E−04 |
| 253 | 168 | 8.08E−05 |
| 254 | 26 | 1.25E−05 |

Depending upon the specific thresholding and connected component analysis methods used, the page background CC generated from the image A (331) may extend into areas which do not belong to the background. In other words, the page background CC may include pixels which belong to content (e.g., along edges of foreground text), rather than the background. Therefore, changing all pixel values of the page background CC to a single value (i.e., the uniform background color) would likely destroy real content, in particular, if natural images are present. Instead, the replacement range is calculated as a range of pixel values (colors) which, with reasonable confidence, do belong to the background. Two example background masks of the image A (331) based on different replacement range generation algorithms are described in reference to FIGS. 3E and 3F below.

FIG. 3E shows a background mask A (341) based on a replacement range [117, 254] that is generated using a method different from the example workflow described in reference to FIGS. 3A-3C and TABLE 1 above. In the background mask A (341), the background is marked with white pixels where much of the background of the natural image (331*a*) and grid lines of the data table (331*b*) are incorrectly marked as background of the image A (331).

Figure 3G:
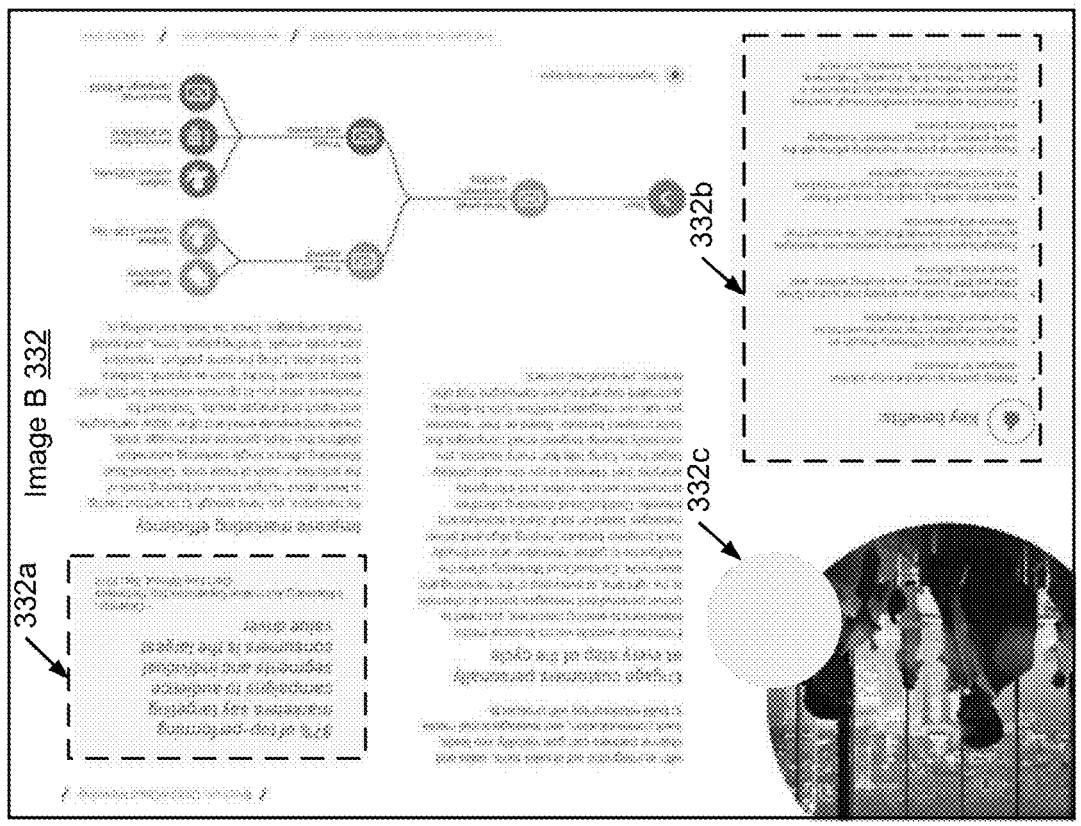
Figure 3F:
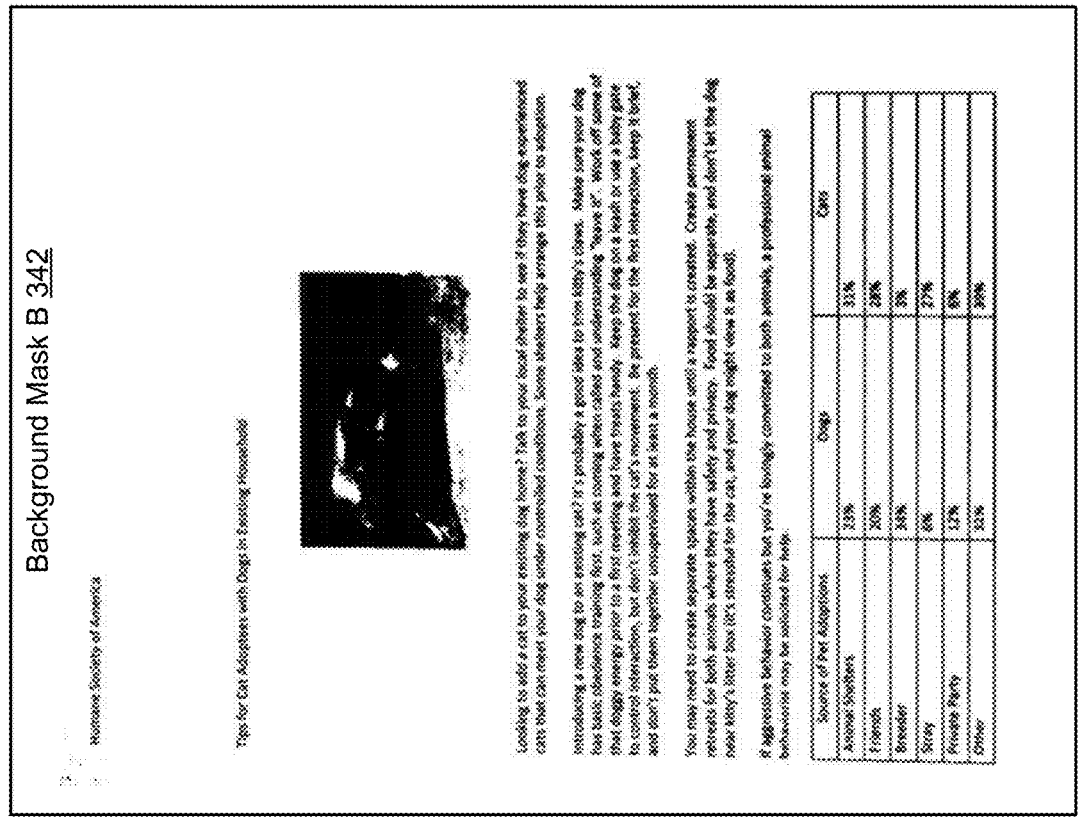

FIG. 3F shows a background mask B (342) of the image A (331) based on a final replacement range [203, 250] that is generated using the example workflow described in reference to FIGS. 3A-3C and TABLE 1 above. In the background mask B (342), the background is marked with white pixels where the background of the natural image (331*a*) and grid lines of the data table (331*b*) are correctly marked as not background of the image A (331).

In performing the example workflow to generate the final replacement range [203, 250], the initial replacement range of the histogram listed in TABLE 2 above is [116, 254], the narrowed replacement range after valley removal in Step 3 of the workflow is [188, 254], and the further narrowed replacement range after pruning in Step 4 of the workflow is [203, 250]. In addition, the mode of the replacement range of the histogram is the pixel value 234 with the pixel count 0.037806, the discard_threshold_range is [0.001, 0.00119018], and the maximum_to_prune is 0.0395243, which all remain the same throughout the iterations.

As noted above, as consecutive pixel values having very similar occurrence percent values are discarded, the range pruning algorithm becomes progressively less likely to discard the remaining pixel values that have very similar occurrence percent values and are consecutive to the discarded pixel values. The histogram listed in TABLE 2 above includes such example where consecutive pixel values 201, 202, and 203 have very similar pixel count percents (~0.001). A good replacement range for the image A (331) would have the minimum equal to a pixel value in the low 200's. Despite the similar pixel count percent values, the range pruning algorithm selects the very acceptable final replacement range [203, 250] based on the dynamically tightening discard_threshold.

TABLE 3 lists parameters generated, or otherwise used, in each iteration of executing the example algorithm code listed in TABLE 1 above with respect to the histogram listed in TABLE 2 above. In TABLE 3, the first column is labeled "CNT" and corresponds to the loop iteration count, the second column is labeled "L/R" and corresponds to the pixel values of the left and right iterators that define the current replacement range, the third column is labeled "DT Pos" and corresponds to the position within the discard threshold range, the fourth column is labeled "DT Value" and corresponds to the discard threshold value, the fifth column is labeled "Smallest Element" and corresponds to the pixel value within the current replacement range with the smallest number of occurrences (i.e., pixel count), the sixth column is labeled "% of maximum_to_prune" and corresponds to the smallest number of occurrences (i.e., pixel count) in the fifth column "Smallest Element" divided by the maximum_to_prune (i.e., 0.0395243).

In TABLE 3, each row corresponds to one iteration to show how each of the parameters changes as the algorithm progresses till meeting the stopping condition when the final replacement range is generated.

TABLE 3

| CNT | L/R | DT Pos | DT Value | Smallest Element | % of maximum_to_prune |
|---|---|---|---|---|---|
| 1 | [188, 254] | 1 | 0.00119 | 254 1.25E−05 | 0.000316525 |
| 2 | [188, 253] | 0.999683 | 0.00119 | 253 8.08E−05 | 0.00204524 |
| 3 | [188, 252] | 0.997638 | 0.00119 | 252 0.000219895 | 0.00556353 |
| 4 | [188, 251] | 0.992075 | 0.001189 | 188 0.000580773 | 0.0146941 |
| 5 | [189, 251] | 0.977381 | 0.001186 | 189 0.000530731 | 0.013428 |
| 6 | [190, 251] | 0.963953 | 0.001183 | 190 0.000534099 | 0.0135132 |
| 7 | [191, 251] | 0.95044 | 0.001181 | 191 0.000572112 | 0.0144749 |
| 8 | [192, 251] | 0.935965 | 0.001178 | 192 0.000572593 | 0.0144871 |
| 9 | [193, 251] | 0.921477 | 0.001175 | 193 0.00057548 | 0.0145601 |
| 10 | [194, 251] | 0.906917 | 0.001172 | 194 0.000560563 | 0.0141827 |
| 11 | [195, 251] | 0.892735 | 0.00117 | 195 0.000574036 | 0.0145236 |
| 12 | [196, 251] | 0.878211 | 0.001167 | 251 0.000580773 | 0.0146941 |
| 13 | [196, 250] | 0.863517 | 0.001164 | 196 0.000600501 | 0.0151932 |
| 14 | [197, 250] | 0.848324 | 0.001161 | 197 0.000596651 | 0.0150958 |
| 15 | [198, 250] | 0.833228 | 0.001158 | 198 0.000647174 | 0.0163741 |
| 16 | [199, 250] | 0.816854 | 0.001155 | 199 0.000824245 | 0.0208541 |
| 17 | [200, 250] | 0.796 | 0.001151 | 200 0.00101431 | 0.0256629 |
| 18 | [201, 250] | 0.770337 | 0.001147 | 201 0.00104606 | 0.0264663 |
| 19 | [202, 250] | 0.743871 | 0.001141 | 202 0.0011038 | 0.0279272 |
| 20 | [203, 250] | 0.715943 | 0.001136 | 203 0.00128088 | 0.0324073 |

FIG. 3G shows an image B (332), which is an example of the document image (102) depicted in FIG. 1 above. The image B (332) includes a text box (332a) and a text box (332b) both having a lightly-colored text box fill. In addition, the image B (332) includes a lightly-colored shading pattern (332c). TABLE 4 below shows an example histogram of the image B (332) having the same format as the histogram of the image A (331) listed in TABLE 2 above.

TABLE 4

| PIXEL VALUE | # OCCURRENCES | PERCENT [0, 1] |
|---|---|---|
| 78 | 2 | 6.30E−07 |
| 79 | 1 | 3.15E−07 |
| 82 | 1 | 3.15E−07 |
| 84 | 2 | 6.30E−07 |
| 86 | 2 | 6.30E−07 |
| 87 | 1 | 3.15E−07 |
| 90 | 2 | 6.30E−07 |
| 91 | 1 | 3.15E−07 |
| 92 | 5 | 1.58E−06 |
| 93 | 3 | 9.46E−07 |
| 94 | 21 | 6.62E−06 |
| 95 | 22 | 6.93E−06 |
| 96 | 178 | 5.61E−05 |
| 97 | 79 | 2.49E−05 |
| 98 | 246 | 7.75E−05 |
| 99 | 62 | 1.95E−05 |
| 100 | 155 | 4.89E−05 |
| 101 | 48 | 1.51E−05 |
| 102 | 107 | 3.37E−05 |
| 103 | 44 | 1.39E−05 |
| 104 | 96 | 3.03E−05 |
| 105 | 50 | 1.58E−05 |
| 106 | 92 | 2.90E−05 |
| 107 | 75 | 2.36E−05 |
| 108 | 78 | 2.46E−05 |
| 109 | 71 | 2.24E−05 |
| 110 | 106 | 3.34E−05 |
| 111 | 100 | 3.15E−05 |
| 112 | 106 | 3.34E−05 |
| 113 | 131 | 4.13E−05 |
| 114 | 151 | 4.76E−05 |
| 115 | 198 | 6.24E−05 |
| 116 | 214 | 6.74E−05 |
| 117 | 242 | 7.63E−05 |
| 118 | 213 | 6.71E−05 |
| 119 | 214 | 6.74E−05 |
| 120 | 172 | 5.42E−05 |
| 121 | 208 | 6.56E−05 |
| 122 | 177 | 5.58E−05 |
| 123 | 164 | 5.17E−05 |
| 124 | 190 | 5.99E−05 |
| 125 | 155 | 4.89E−05 |
| 126 | 153 | 4.82E−05 |
| 127 | 153 | 4.82E−05 |
| 128 | 177 | 5.58E−05 |
| 129 | 128 | 4.03E−05 |
| 130 | 105 | 3.31E−05 |
| 131 | 121 | 3.81E−05 |
| 132 | 104 | 3.28E−05 |
| 133 | 90 | 2.84E−05 |
| 134 | 93 | 2.93E−05 |
| 135 | 101 | 3.18E−05 |

TABLE 4-continued

| PIXEL VALUE | # OCCURRENCES | PERCENT [0, 1] |
|---|---|---|
| 136 | 87 | 2.74E−05 |
| 137 | 79 | 2.49E−05 |
| 138 | 85 | 2.68E−05 |
| 139 | 77 | 2.43E−05 |
| 140 | 78 | 2.46E−05 |
| 141 | 89 | 2.81E−05 |
| 142 | 81 | 2.55E−05 |
| 143 | 82 | 2.58E−05 |
| 144 | 75 | 2.36E−05 |
| 145 | 74 | 2.33E−05 |
| 146 | 93 | 2.93E−05 |
| 147 | 62 | 1.95E−05 |
| 148 | 75 | 2.36E−05 |
| 149 | 80 | 2.52E−05 |
| 150 | 83 | 2.62E−05 |
| 151 | 72 | 2.27E−05 |
| 152 | 84 | 2.65E−05 |
| 153 | 83 | 2.62E−05 |
| 154 | 81 | 2.55E−05 |
| 155 | 67 | 2.11E−05 |
| 156 | 72 | 2.27E−05 |
| 157 | 88 | 2.77E−05 |
| 158 | 89 | 2.81E−05 |
| 159 | 87 | 2.74E−05 |
| 160 | 107 | 3.37E−05 |
| 161 | 74 | 2.33E−05 |
| 162 | 69 | 2.17E−05 |
| 163 | 94 | 2.96E−05 |
| 164 | 77 | 2.43E−05 |
| 165 | 73 | 2.30E−05 |
| 166 | 90 | 2.84E−05 |
| 167 | 71 | 2.24E−05 |
| 168 | 86 | 2.71E−05 |
| 169 | 83 | 2.62E−05 |
| 170 | 92 | 2.90E−05 |
| 171 | 66 | 2.08E−05 |
| 172 | 87 | 2.74E−05 |
| 173 | 91 | 2.87E−05 |
| 174 | 98 | 3.09E−05 |
| 175 | 88 | 2.77E−05 |
| 176 | 115 | 3.62E−05 |
| 177 | 128 | 4.03E−05 |
| 178 | 125 | 3.94E−05 |
| 179 | 112 | 3.53E−05 |
| 180 | 107 | 3.37E−05 |
| 181 | 122 | 3.85E−05 |
| 182 | 114 | 3.59E−05 |
| 183 | 126 | 3.97E−05 |
| 184 | 132 | 4.16E−05 |
| 185 | 113 | 3.56E−05 |
| 186 | 121 | 3.81E−05 |
| 187 | 122 | 3.85E−05 |
| 188 | 128 | 4.03E−05 |
| 189 | 103 | 3.25E−05 |
| 190 | 107 | 3.37E−05 |
| 191 | 132 | 4.16E−05 |
| 192 | 94 | 2.96E−05 |
| 193 | 122 | 3.85E−05 |
| 194 | 120 | 3.78E−05 |
| 195 | 132 | 4.16E−05 |
| 196 | 126 | 3.97E−05 |
| 197 | 118 | 3.72E−05 |
| 198 | 120 | 3.78E−05 |
| 199 | 128 | 4.03E−05 |
| 200 | 122 | 3.85E−05 |
| 201 | 125 | 3.94E−05 |
| 202 | 124 | 3.91E−05 |
| 203 | 109 | 3.44E−05 |
| 204 | 101 | 3.18E−05 |
| 205 | 108 | 3.40E−05 |
| 206 | 105 | 3.31E−05 |
| 207 | 104 | 3.28E−05 |
| 208 | 98 | 3.09E−05 |
| 209 | 89 | 2.81E−05 |
| 210 | 91 | 2.87E−05 |
| 211 | 83 | 2.62E−05 |
| 212 | 81 | 2.55E−05 |

TABLE 4-continued

| PIXEL VALUE | # OCCURRENCES | PERCENT [0, 1] |
|---|---|---|
| 213 | 82 | 2.58E−05 |
| 214 | 67 | 2.11E−05 |
| 215 | 78 | 2.46E−05 |
| 216 | 92 | 2.90E−05 |
| 217 | 80 | 2.52E−05 |
| 218 | 90 | 2.84E−05 |
| 219 | 76 | 2.40E−05 |
| 220 | 74 | 2.33E−05 |
| 221 | 68 | 2.14E−05 |
| 222 | 51 | 1.61E−05 |
| 223 | 67 | 2.11E−05 |
| 224 | 66 | 2.08E−05 |
| 225 | 70 | 2.21E−05 |
| 226 | 61 | 1.92E−05 |
| 227 | 60 | 1.89E−05 |
| 228 | 51 | 1.61E−05 |
| 229 | 49 | 1.54E−05 |
| 230 | 50 | 1.58E−05 |
| 231 | 45 | 1.42E−05 |
| 232 | 674 | 0.000212425 |
| 233 | 37 | 1.17E−05 |
| 234 | 32 | 1.01E−05 |
| 235 | 26 | 8.19E−06 |
| 236 | 43 | 1.36E−05 |
| 237 | 51 | 1.61E−05 |
| 238 | 27 | 8.51E−06 |
| 239 | 37 | 1.17E−05 |
| 240 | 21 | 6.62E−06 |
| 241 | 36 | 1.13E−05 |
| 242 | 33 | 1.04E−05 |
| 243 | 37 | 1.17E−05 |
| 244 | 126 | 3.97E−05 |
| 245 | 37 | 1.17E−05 |
| 246 | 40 | 1.26E−05 |
| 247 | 771 | 0.000242996 |
| 248 | 3881 | 0.00122318 |
| 249 | 846889 | 0.266914 |
| 250 | 4597 | 0.00144884 |
| 251 | 4590 | 0.00144663 |
| 252 | 4553 | 0.00143497 |
| 253 | 3518 | 0.00110877 |
| 254 | 4138 | 0.00130417 |
| 255 | 2284533 | 0.720016 |

Figure 3I:
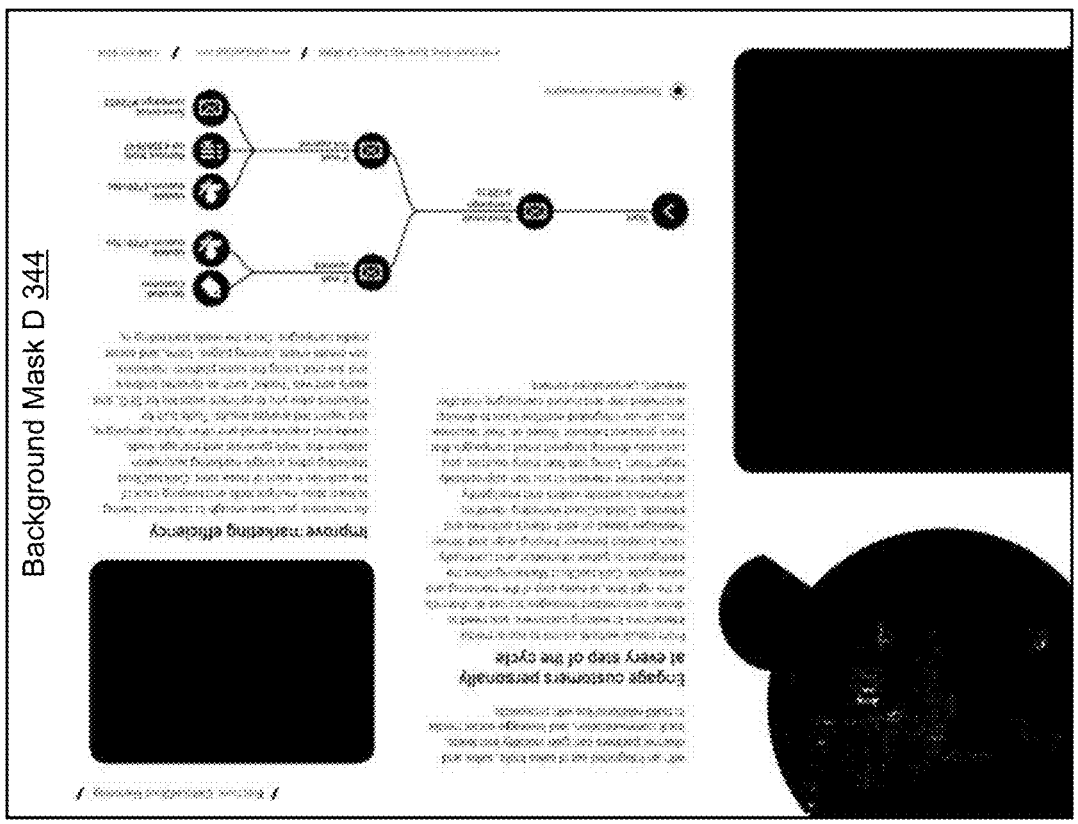
Figure 3H:
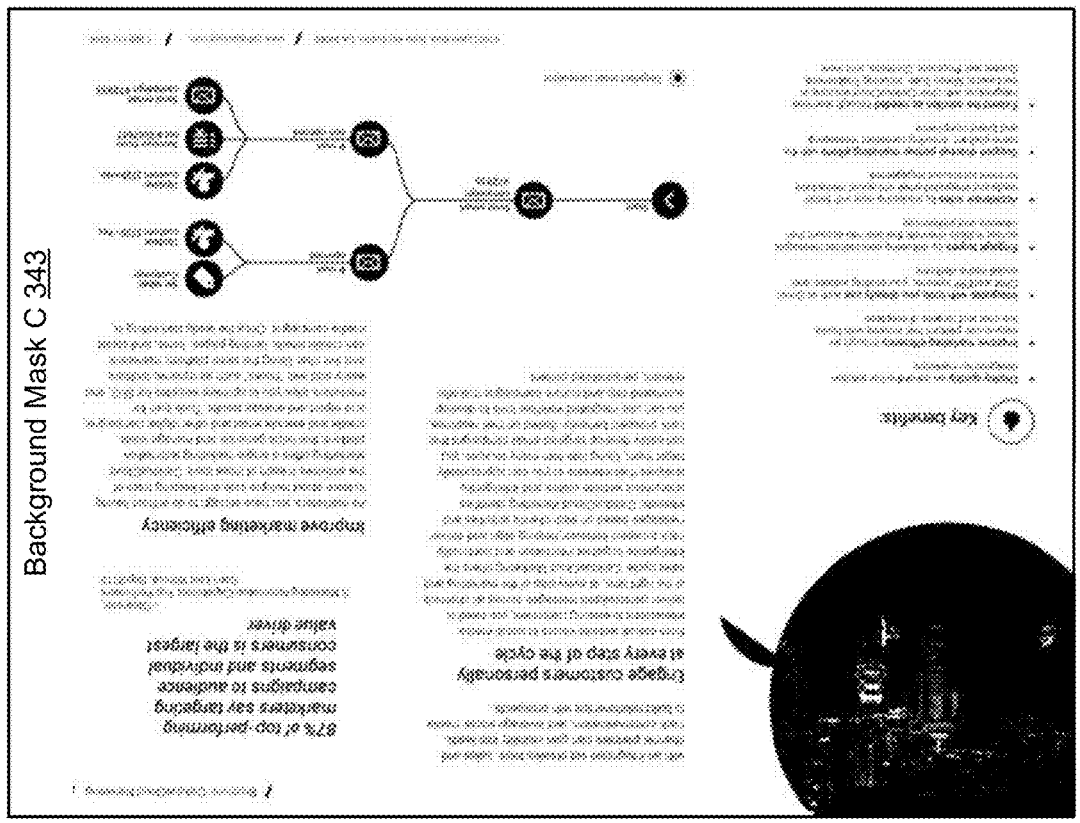

FIG. 3H shows a background mask C (343) based on a replacement range [249, 255] that is generated using a method different from the example workflow described in reference to FIGS. 3A-3C and TABLE 1 above. In the background mask C (343), the background is marked with white pixels where much of the lightly-colored text box fills (332a) and (332b), and part of the lightly-colored shading pattern (332c) are incorrectly marked as background.

FIG. 3I shows a background mask D (344) based on a final replacement range [255, 255] that is generated using the example workflow described in reference to FIGS. 3A-3C and TABLE 1 above. In the background mask D (344), the background is marked with white pixels where the lightly-colored text box fills (332a) and (332b), and most part of the lightly-colored shading pattern (332c) are correctly marked as not background of the image B (332).

In performing the example workflow to generate the final replacement range [255, 255], the initial replacement range of the histogram listed in TABLE 4 above is [78, 255], the narrowed replacement range after valley removal in Step 3 of the workflow is [250, 255], and the further narrowed replacement range after pruning in Step 4 of the workflow is [255, 255].

FIG. 3J shows an image C (333), which is an example of the document image (102) depicted in FIG. 1 above. The image C (333) includes 10 colored text boxes (e.g., text box (333*a*)) each having a lightly-colored text box fill. TABLE 5 below shows an example histogram of the image C (333) having the same format as the histogram of the image A (331) listed in TABLE 2 above.

TABLE 5

| PIXEL VALUE | # OCCURRENCES | PERCENT [0, 1] |
|---|---|---|
| 121 | 2 | 7.45E−07 |
| 122 | 1 | 3.73E−07 |
| 123 | 2 | 7.45E−07 |
| 124 | 1 | 3.73E−07 |
| 125 | 6 | 2.24E−06 |
| 126 | 4 | 1.49E−06 |
| 127 | 8 | 2.98E−06 |
| 128 | 11 | 4.10E−06 |
| 129 | 23 | 8.57E−06 |
| 130 | 15 | 5.59E−06 |
| 131 | 24 | 8.94E−06 |
| 132 | 36 | 1.34E−05 |
| 133 | 40 | 1.49E−05 |
| 134 | 68 | 2.53E−05 |
| 135 | 71 | 2.65E−05 |
| 136 | 101 | 3.76E−05 |
| 137 | 99 | 3.69E−05 |
| 138 | 132 | 4.92E−05 |
| 139 | 155 | 5.78E−05 |
| 140 | 218 | 8.12E−05 |
| 141 | 244 | 9.09E−05 |
| 142 | 305 | 1.14E−04 |
| 143 | 308 | 1.15E−04 |
| 144 | 460 | 1.71E−04 |
| 145 | 424 | 1.58E−04 |
| 146 | 583 | 2.17E−04 |
| 147 | 590 | 2.20E−04 |
| 148 | 775 | 2.89E−04 |
| 149 | 912 | 3.40E−04 |
| 150 | 1110 | 4.14E−04 |
| 151 | 1163 | 4.33E−04 |
| 152 | 1498 | 5.58E−04 |
| 153 | 1708 | 6.37E−04 |
| 154 | 2174 | 8.10E−04 |
| 155 | 2340 | 8.72E−04 |
| 156 | 2993 | 1.12E−03 |
| 157 | 3173 | 1.18E−03 |
| 158 | 4015 | 1.50E−03 |
| 159 | 4069 | 1.52E−03 |
| 160 | 5058 | 1.88E−03 |
| 161 | 5156 | 1.92E−03 |
| 162 | 6254 | 2.33E−03 |
| 163 | 6187 | 2.31E−03 |
| 164 | 6662 | 2.48E−03 |
| 165 | 6136 | 2.29E−03 |
| 166 | 6954 | 2.59E−03 |
| 167 | 6406 | 2.39E−03 |
| 168 | 7138 | 2.66E−03 |
| 169 | 6773 | 2.52E−03 |
| 170 | 8283 | 3.09E−03 |
| 171 | 7573 | 2.82E−03 |
| 172 | 7277 | 2.71E−03 |
| 173 | 5629 | 2.10E−03 |
| 174 | 5574 | 2.08E−03 |
| 175 | 4782 | 1.78E−03 |
| 176 | 4421 | 1.65E−03 |
| 177 | 3892 | 1.45E−03 |
| 178 | 3252 | 1.21E−03 |
| 179 | 2760 | 1.03E−03 |
| 180 | 2245 | 8.37E−04 |
| 181 | 1960 | 7.30E−04 |
| 182 | 1561 | 5.82E−04 |
| 183 | 1302 | 4.85E−04 |
| 184 | 1312 | 4.89E−04 |
| 185 | 1349 | 5.03E−04 |
| 186 | 1443 | 5.38E−04 |
| 187 | 1511 | 5.63E−04 |
| 188 | 1751 | 6.53E−04 |
| 189 | 2127 | 7.93E−04 |
| 190 | 2534 | 9.44E−04 |
| 191 | 3066 | 1.14E−03 |
| 192 | 3825 | 1.43E−03 |
| 193 | 4971 | 1.85E−03 |
| 194 | 6444 | 2.40E−03 |
| 195 | 8792 | 3.28E−03 |
| 196 | 11508 | 4.29E−03 |
| 197 | 15191 | 5.66E−03 |
| 198 | 19161 | 7.14E−03 |
| 199 | 24115 | 8.99E−03 |
| 200 | 29826 | 1.11E−02 |
| 201 | 34327 | 1.28E−02 |
| 202 | 36529 | 1.36E−02 |
| 203 | 36107 | 1.35E−02 |
| 204 | 33295 | 1.24E−02 |
| 205 | 31826 | 1.19E−02 |
| 206 | 31285 | 1.17E−02 |
| 207 | 27106 | 1.01E−02 |
| 208 | 23833 | 8.88E−03 |
| 209 | 22058 | 8.22E−03 |
| 210 | 21425 | 7.98E−03 |
| 211 | 20616 | 7.68E−03 |
| 212 | 21757 | 8.11E−03 |
| 213 | 20833 | 7.76E−03 |
| 214 | 20297 | 7.56E−03 |
| 215 | 19381 | 7.22E−03 |
| 216 | 17165 | 6.40E−03 |
| 217 | 14787 | 5.51E−03 |
| 218 | 13145 | 4.90E−03 |
| 219 | 11489 | 4.28E−03 |
| 220 | 10194 | 3.80E−03 |
| 221 | 8553 | 3.19E−03 |
| 222 | 6997 | 2.61E−03 |
| 223 | 5778 | 2.15E−03 |
| 224 | 4874 | 1.82E−03 |
| 225 | 4339 | 1.62E−03 |
| 226 | 4110 | 1.53E−03 |
| 227 | 4301 | 1.60E−03 |
| 228 | 4946 | 1.84E−03 |
| 229 | 6120 | 2.28E−03 |
| 230 | 7356 | 2.74E−03 |
| 231 | 9119 | 3.40E−03 |
| 232 | 10878 | 4.05E−03 |
| 233 | 12390 | 4.62E−03 |
| 234 | 14188 | 5.29E−03 |
| 235 | 15409 | 5.74E−03 |
| 236 | 16572 | 6.18E−03 |
| 237 | 16530 | 6.16E−03 |
| 238 | 15436 | 5.75E−03 |
| 239 | 13555 | 5.05E−03 |
| 240 | 11626 | 4.33E−03 |
| 241 | 9023 | 3.36E−03 |
| 242 | 6615 | 2.47E−03 |
| 243 | 4688 | 1.75E−03 |
| 244 | 3691 | 1.38E−03 |
| 245 | 3254 | 1.21E−03 |
| 246 | 3040 | 1.13E−03 |
| 247 | 2521 | 9.39E−04 |
| 248 | 2502 | 9.32E−04 |
| 249 | 2209 | 8.23E−04 |
| 250 | 2051 | 7.64E−04 |
| 251 | 2530 | 9.43E−04 |
| 252 | 4032 | 1.50E−03 |
| 253 | 14316 | 5.34E−03 |
| 254 | 72714 | 2.71E−02 |
| 255 | 1597657 | 5.95E−01 |

FIG. 3K shows a background mask E (345) based on a replacement range [126, 255] that is generated using a method different from the example workflow described in reference to FIGS. 3A-3C and TABLE 1 above. In the background mask E (345), the background is marked with white pixels where much of the lightly-colored text boxes (i.e., text box (333*a*)) are incorrectly marked as background.

Figure 3L:
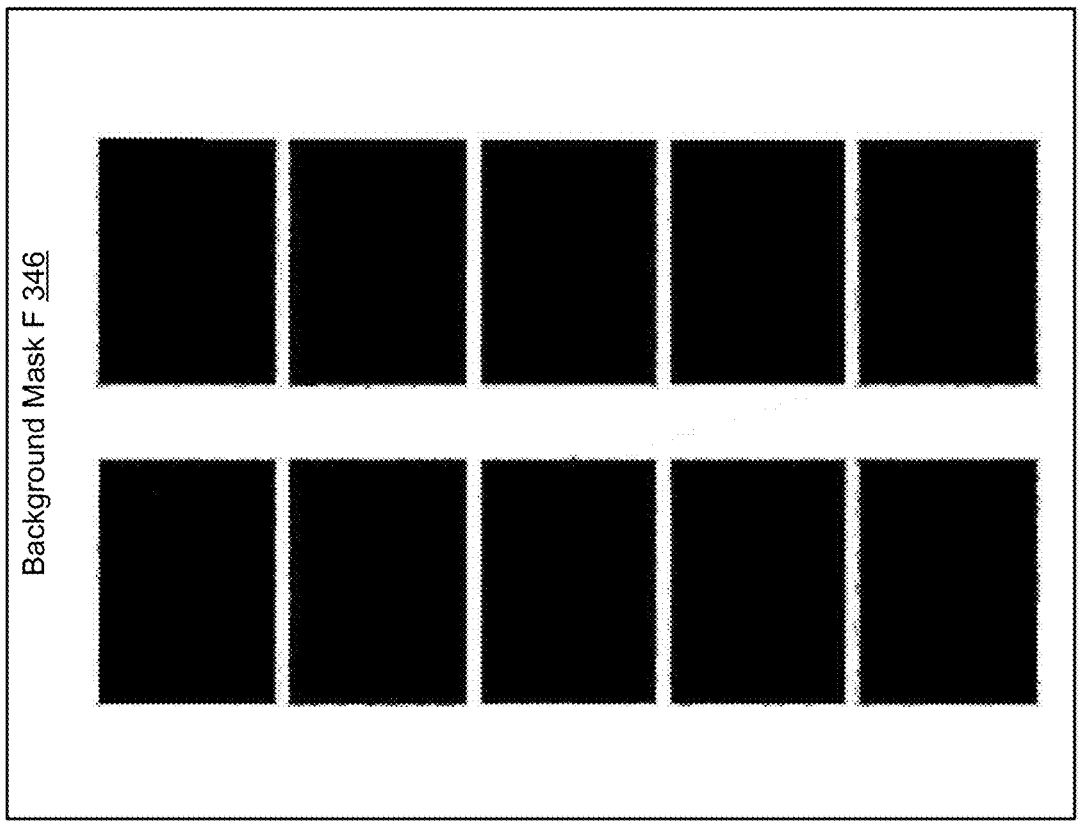

FIG. 3L shows a background mask F (346) based on a final replacement range [254, 255] that is generated using the example workflow described in reference to FIGS.

3A-3C and TABLE 1 above. In the background mask F (346), the background is marked with white pixels where all 10 of the lightly-colored text boxes are correctly marked as not background of the image C (333).

In performing the example workflow to generate the final replacement range [254, 255], the initial replacement range of the histogram listed in TABLE 5 above is [121, 255], the narrowed replacement range after valley removal in Step 3 of the workflow is [245, 255], and the further narrowed replacement range after pruning in Step 4 of the workflow is [254, 255].

Figure 4:
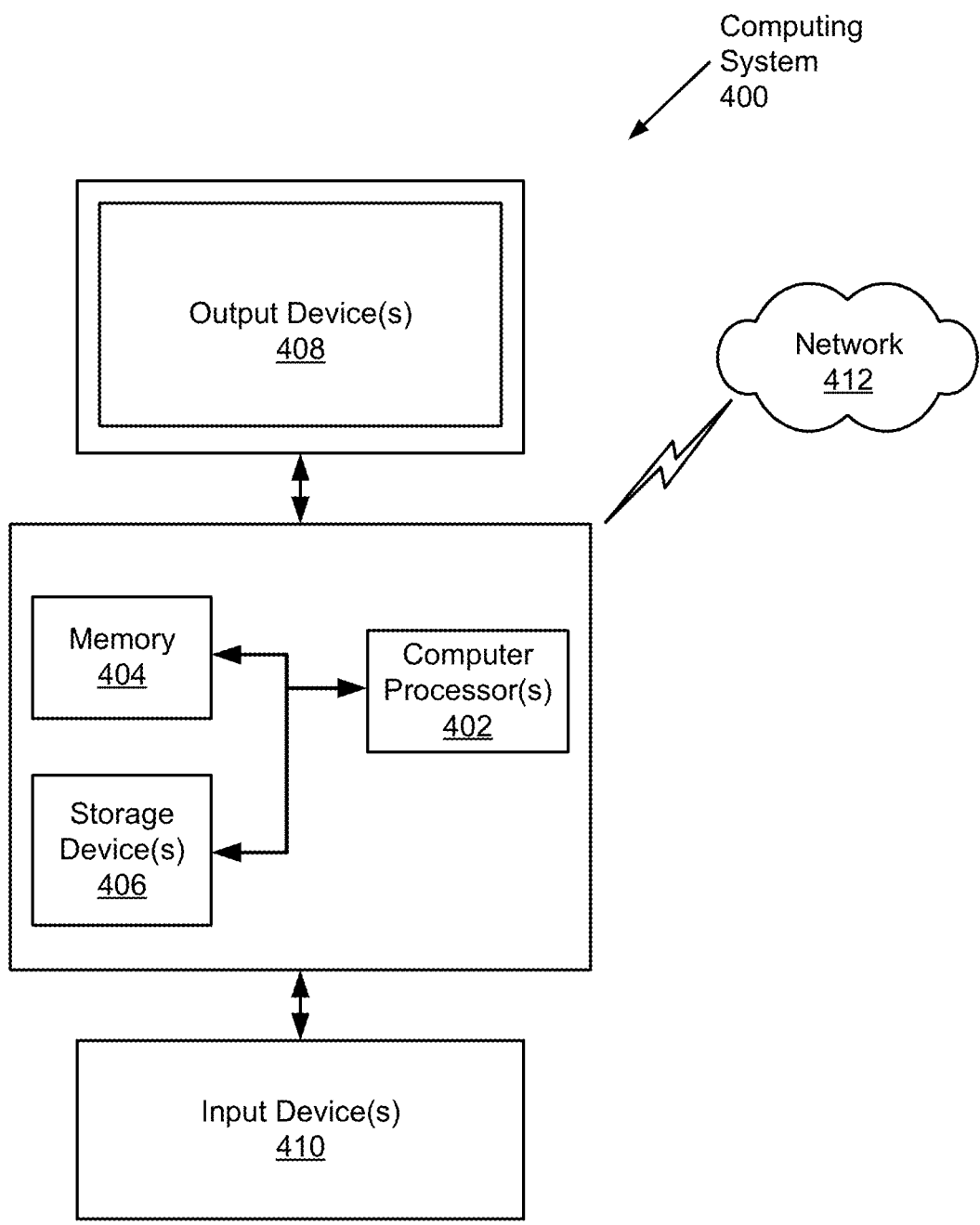
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable instructions to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable instructions that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the following improvements in document image background noise reduction technologies: allowing noisier backgrounds to be more aggressively cleaned than cleaner backgrounds in the document image, and reducing the risk in degrading actual content in a cleaner image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to reduce background noise in a document image, the method comprising:
   extracting, from the document image, a connected component corresponding to a background of the document image;
   generating a histogram of pixel values of the connected component;
   generating a replacement range using a range pruning algorithm that narrows a range of the histogram by iteratively discarding at least one pixel value and corresponding pixel count of the histogram from at least one side of the histogram;
   selecting, from the connected component, at least one pixel having a corresponding pixel value within the replacement range;
   converting the corresponding pixel value of the at least one pixel to a uniform background color; and
   outputting, subsequent to the converting, the document image.

2. The method of claim 1,
   wherein the range pruning algorithm further narrows the range of the histogram by discarding at least one pixel value with a corresponding number of occurrences below a pre-determined threshold from the at least one side of the histogram.

3. The method of claim 1, wherein generating the replacement range comprises:
   generating, prior to a plurality of iterations of the range pruning algorithm, a discard threshold range based on a mode of the histogram;
   generating, in a current iteration of the plurality of iterations, a current discard threshold within the discard threshold range, wherein the current discard threshold is iteratively reduced from a maximum of the discard threshold range based on a ratio of a current discarded pixel count percent over a predetermined total discarded pixel count percent; and
   terminating the plurality of iterations when a smallest pixel count percent in a current narrowed histogram after removing the at least one valley is greater than or equal to the current discard threshold.

4. The method of claim 3,
   wherein the discard threshold range is an exponential function of a pixel count percent of the mode of the histogram.

5. The method of claim 3,
wherein the predetermined total discarded pixel count percent is a logarithmic function of a pixel count percent of the mode of the histogram.

6. The method of claim 1, further comprising:
identifying a dominant pixel value in the histogram of pixel values as the uniform background color,
wherein the dominant pixel value corresponds to a maximum pixel count in the histogram of pixel values.

7. The method of claim 1, wherein extracting the connected component comprises:
extracting a plurality of connected components from the document image;
comparing a dimension of the document image to the plurality of connected components to generate a comparison result; and
selecting, based on the comparison result, the connected component from the plurality of connected components as corresponding to the background of the document image.

8. A system for reducing background noise in a document image, the system comprising:
a memory; and
a computer processor connected to the memory and that:
extracts, from the document image, a connected component corresponding to a background of the document image;
generates a histogram of pixel values of the connected component;
generates a replacement range using a range pruning algorithm that narrows a range of the histogram by iteratively discarding at least one pixel value and corresponding pixel count of the histogram from at least one side of the histogram;
selects, from the connected component, at least one pixel having a corresponding pixel value within the replacement range;
converts the corresponding pixel value of the at least one pixel to a uniform background color; and
outputs, subsequent to the converting, the document image.

9. The system of claim 8,
wherein the range pruning algorithm further narrows the range of the histogram by discarding at least one pixel values with corresponding number of occurrences below a pre-determined threshold from the at least one side of the histogram.

10. The system of claim 8, wherein generating the replacement range comprises:
generating, prior to a plurality of iterations of the range pruning algorithm, a discard threshold range based on a mode of the histogram;
generating, in a current iteration of the plurality of iterations, a current discard threshold within the discard threshold range, wherein the current discard threshold is iteratively reduced from a maximum of the discard threshold range based on a ratio of a current discarded pixel count percent over a predetermined total discarded pixel count percent; and
terminating the plurality of iterations when a smallest pixel count percent in a current narrowed histogram after removing the at least one valley is greater than or equal to the current discard threshold.

11. The system of claim 10,
wherein the discard threshold range is an exponential function of a pixel count percent of the mode of the histogram.

12. The system of claim 10,
wherein the predetermined total discarded pixel count percent is a logarithmic function of a pixel count percent of the mode of the histogram.

13. The system of claim 8, wherein the computer processor further:
identifies a dominant pixel value in the histogram of pixel values as the uniform background color,
wherein the dominant pixel value corresponds to a maximum pixel count in the histogram of pixel values.

14. The system of claim 8, wherein extracting the connected component comprises:
extracting a plurality of connected components from the document image;
comparing a dimension of the document image to the plurality of connected components to generate a comparison result; and
selecting, based on the comparison result, the connected component from the plurality of connected components as corresponding to the background of the document image.

15. A non-transitory computer readable medium (CRM) storing computer readable instructions for reducing background noise in a document image, wherein the computer readable instructions, when executed by a computer, comprises functionality for:
extracting, from the document image, a connected component corresponding to a background of the document image;
generating a histogram of pixel values of the connected component;
generating a replacement range using a range pruning algorithm that narrows a range of the histogram by iteratively discarding at least one pixel value and corresponding pixel count of the histogram from at least one side of the histogram;
selecting, from the connected component, at least one pixel having a corresponding pixel value within the replacement range;
converting the corresponding pixel value of the at least one pixel to a uniform background color; and
outputting, subsequent to the converting, the document image.

16. The non-transitory CRM of claim 15,
wherein the range pruning algorithm further narrows the range of the histogram by discarding at least one pixel values with corresponding number of occurrences below a pre-determined threshold from the at least one side of the histogram.

17. The non-transitory CRM of claim 15, wherein generating the replacement range comprises:
generating, prior to a plurality of iterations of the range pruning algorithm, a discard threshold range based on a mode of the histogram;
generating, in a current iteration of the plurality of iterations, a current discard threshold within the discard threshold range, wherein the current discard threshold is iteratively reduced from a maximum of the discard threshold range based on a ratio of a current discarded pixel count percent over a predetermined total discarded pixel count percent; and
terminating the plurality of iterations when a smallest pixel count percent in a current narrowed histogram after removing the at least one valley is greater than or equal to the current discard threshold.

18. The non-transitory CRM of claim 17,
wherein the discard threshold range is an exponential function of a pixel count percent of the mode of the histogram.

19. The non-transitory CRM of claim 17,
wherein the predetermined total discarded pixel count percent is a logarithmic function of a pixel count percent of the mode of the histogram.

20. The non-transitory CRM of claim 15, the computer readable instructions, when executed by the computer, further comprising functionality for:
identifying a dominant pixel value in the histogram of pixel values as the uniform background color,
wherein the dominant pixel value corresponds to a maximum pixel count in the histogram of pixel values.

21. The non-transitory CRM of claim 15, wherein extracting the connected component comprises:
extracting a plurality of connected components from the document image;
comparing a dimension of the document image to the plurality of connected components to generate a comparison result; and
selecting, based on the comparison result, the connected component from the plurality of connected components as corresponding to the background of the document image.

* * * * *